US011468484B2

(12) United States Patent
Miller

(10) Patent No.: US 11,468,484 B2
(45) Date of Patent: Oct. 11, 2022

(54) DIRECT-TO-BUSINESS FEEDBACK COMMUNICATION AND DATABASE MANAGEMENT SYSTEM

(71) Applicant: Lisa Therese Miller, Palm Beach Gardens, FL (US)

(72) Inventor: Lisa Therese Miller, Palm Beach Gardens, FL (US)

( * ) Notice: Subject to any disclaimer, the term of this patent is extended or adjusted under 35 U.S.C. 154(b) by 161 days.

(21) Appl. No.: 16/448,277

(22) Filed: Jun. 21, 2019

(65) Prior Publication Data

US 2019/0392493 A1    Dec. 26, 2019

Related U.S. Application Data

(60) Provisional application No. 62/687,822, filed on Jun. 21, 2018.

(51) Int. Cl.
*G06Q 30/02* (2012.01)
*G06F 16/953* (2019.01)
*G06F 16/25* (2019.01)

(52) U.S. Cl.
CPC ....... *G06Q 30/0282* (2013.01); *G06F 16/953* (2019.01); *G06F 16/252* (2019.01)

(58) Field of Classification Search
CPC .. G06Q 30/0282; G06F 16/953; G06F 16/252
See application file for complete search history.

(56) References Cited

U.S. PATENT DOCUMENTS

| 2006/0253316 | A1* | 11/2006 | Blackshaw | G06Q 30/02 705/7.32 |
|---|---|---|---|---|
| 2011/0106721 | A1* | 5/2011 | Nickerson | G06Q 30/02 705/347 |
| 2014/0222512 | A1* | 8/2014 | Pace | G06Q 30/0203 705/7.32 |
| 2014/0289160 | A1* | 9/2014 | Stovall | G06Q 30/0282 705/347 |
| 2015/0046371 | A1* | 2/2015 | Leary | G06F 40/253 705/347 |
| 2016/0034918 | A1* | 2/2016 | Bjelajac | G06Q 30/0201 705/7.32 |
| 2016/0034930 | A1* | 2/2016 | Verschoor | G06Q 30/0203 705/7.32 |

(Continued)

*Primary Examiner* — Andrew T Chiusano
(74) *Attorney, Agent, or Firm* — Ashok Tankha

(57) ABSTRACT

A method and a direct-to-business feedback communication and database management system (DTBFCDMS) for communicating enhanced feedback from a customer directly to a business entity in real time is provided. The DTBFCDMS controls a client application deployed on a customer device and renders a customer feedback interface (CFI) on the customer device. The DTBFCDMS renders information of a business entity in response to a search query received from the customer device, renders feedback categories on the CFI, receives feedback of one or more media types associated with a selected feedback category from the customer device via the CFI, stores the feedback in one or more client databases, extracts feedback elements from the feedback, weights each feedback element based on weighting criteria, generates a score for the feedback based on the weighting of each feedback element, and transmits the feedback with the generated score directly to the business entity in real time.

12 Claims, 21 Drawing Sheets

(56) References Cited

U.S. PATENT DOCUMENTS

2016/0267422 A1\* 9/2016 Kothadiya ............. G06Q 50/01
2017/0024753 A1\* 1/2017 Packer ............... G06Q 30/0202
2020/0004816 A1\* 1/2020 Kieser .................... G06F 40/30

\* cited by examiner

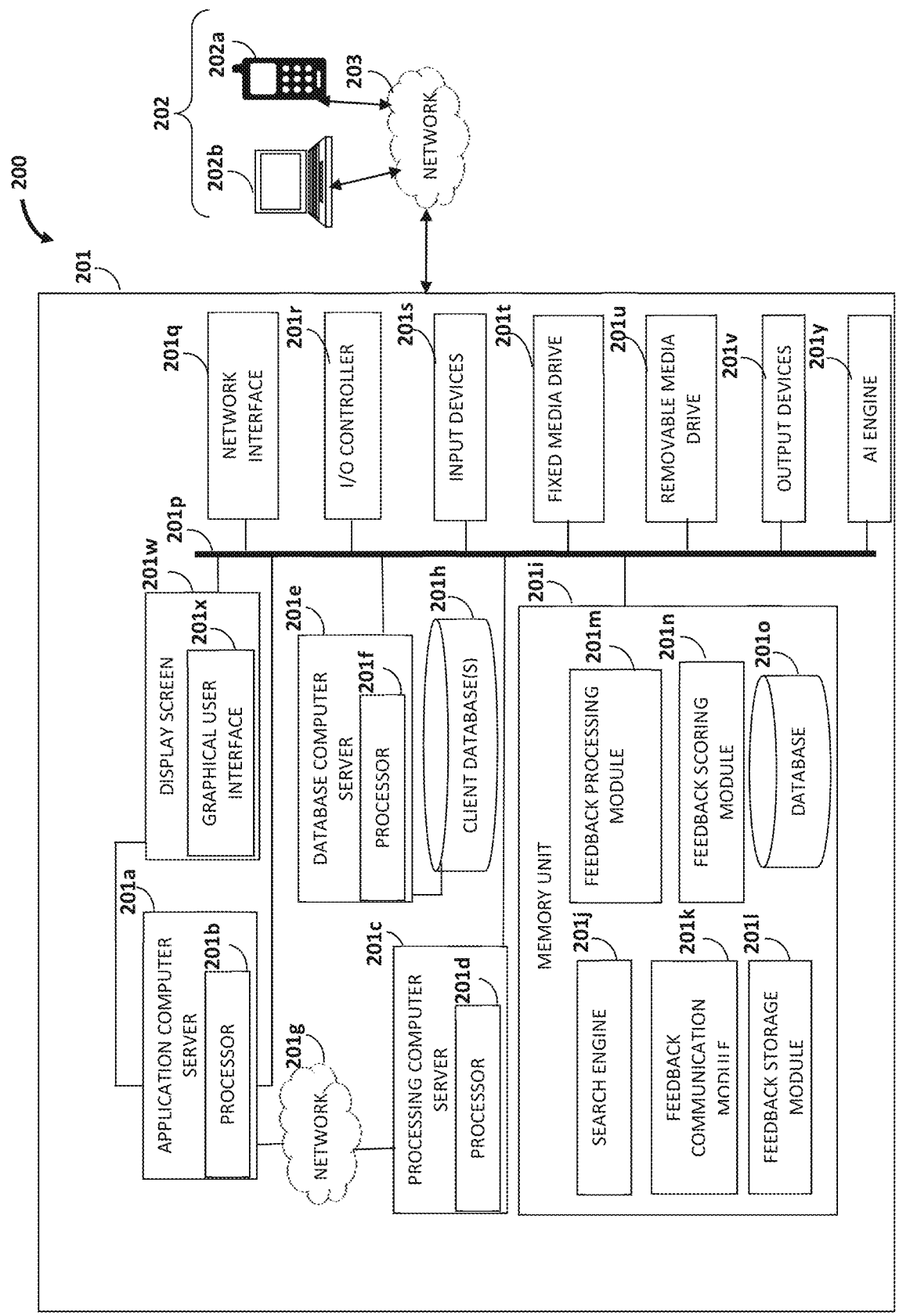

Sugezt has four categories of customer insight:

1. An Improvement to an existing service, product and experience

"Lorem ipsum dolor sit amet, consectetur adipiscing elit. Nullam pulvinar ligula ac volutpat dapibus."

2. An Innovation or new idea that doesn't exist in their business

"Lorem ipsum dolor sit amet, consectetur adipiscing elit. Nullam pulvinar ligula ac volutpat dapibus."

Sugezt has four categories of customer insight:

3. A Challenge or problem you encountered that you want to resolve or communicate with the business in order to fix "Lorem ipsum dolor sit amet, consectetur adipiscing elit. Nullam pulvinar ligula ac volutpat dapibus."

4. A Praise for great service or a great experience you received

"Lorem ipsum dolor sit amet, consectetur adipiscing elit. Nullam pulvinar ligula ac volutpat dapibus."

• • • •

Got it!

DIRECT-TO-BUSINESS FEEDBACK COMMUNICATION AND DATABASE MANAGEMENT SYSTEM

CROSS-REFERENCE TO RELATED APPLICATIONS

This application claims priority to and the benefit of the provisional patent application No. 62/687,822 titled "Direct-To-Business Feedback Communication And Database Management System", filed in the United States Patent and Trademark Office on Jun. 21, 2018. The specification of the above referenced patent application is incorporated herein by reference in its entirety.

BACKGROUND

Often, incidents that occur on the frontline of a business and customer experiences related to the business are insubstantially and minimally communicated to the leadership team of a business. Customers typically do not have a convenient method, access, or a platform for directly communicating their ideas, innovations, challenges, frustrations, or praises to leaders of a business entity who can address and resolve issues related such issues and challenges.

Hence, there is a long felt but unresolved need for a method and a direct-to-business feedback communication and database management system that provides access and a direct line for communicating feedback associated with one or more of multiple feedback categories in one or more of multiple media types from a customer to a business entity directly in real time.

SUMMARY OF THE INVENTION

This summary is provided to introduce a selection of concepts in a simplified form that are further disclosed in the detailed description of the invention. This summary is not intended to determine the scope of the claimed subject matter.

The method and the direct-to-business feedback communication and database management system (DTBFCDMS) disclosed herein address the above recited need for providing access and a direct line for communicating feedback associated with one or more of multiple feedback categories in one or more of multiple media types from a customer to a business entity directly in real time. The DTBFCDMS disclosed herein provides a direct line of communication between customers and the business entity for communicating enhanced feedback, for example, customer suggestions, in real time for immediate change management, innovation, and ongoing management of suggestions in a private system setup.

The method disclosed herein employs a direct-to-business feedback communication and database management system (DTBFCDMS), incorporating a computer system architecture for communicating enhanced feedback from a customer directly to a business entity in real time. The DTBFCDMS comprises at least one application computer server, at least one processing computer server, and at least one database computer server. The application computer server comprises at least one processor for controlling a client application deployed on the customer device and for rendering a customer feedback interface on the customer device. The processing computer server comprises at least one processor communicatively coupled to the application computer server via a network and configured to execute computer program instructions defined by modules of the DTBFCDMS. The modules of the DTBFCDMS comprise a search engine, a feedback communication module, a feedback storage module, a feedback processing module, and a feedback scoring module.

In the method disclosed herein, the search engine of the direct-to-business feedback communication and database management system (DTBFCDMS) receives a search query related to the business entity from a customer device and in response, renders information of the business entity on a graphical user interface of the customer device in real time. The feedback communication module renders a customer feedback interface with multiple feedback categories on the graphical user interface of the customer device in real time. The feedback categories comprise, for example, an improvement category, an innovation category, a challenge category, a praise category, etc. Furthermore, the feedback communication module receives a selection of one or more of the feedback categories and corresponding feedback of one or more media types associated with those feedback categories in real time from the customer device through the customer feedback interface. The feedback storage module stores the received feedback in one or more of multiple client databases accessed by the database computer server of the DTBFCDMS in real time. The feedback processing module extracts one or more feedback elements from the stored feedback and weights each of the feedback elements based on predetermined weighting criteria in real time. Each of the feedback elements is related to one or more of the predetermined weighting criteria. The predetermined weighting criteria comprise, for example, importance, implementation, gamification, and incentivization of the received feedback. The feedback scoring module generates a score for the received feedback based on the weighting of each of the feedback elements in real time. The feedback communication module then transmits enhanced feedback comprising the received feedback with the generated score directly to the business entity in real time.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, in an embodiment, various structural elements can be employed depending on the design choice of the system designer.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific methods and structures/components disclosed herein. The description of a method step or a structure/component referenced by a numeral in a drawing is applicable to the description of that method step or structure/component shown by that same numeral in any subsequent drawing herein.

FIG. 2 exemplarily illustrates a system comprising the direct-to-business feedback communication and database management system incorporating a computer system architecture for communicating enhanced feedback from a customer directly to a business entity in real time.

DETAILED DESCRIPTION OF THE INVENTION

Disclosed herein is a direct-to-business feedback communication and database management system (DTBFCDMS) that incorporates a computer system architecture for communicating feedback from a customer, for example, a consumer of a product or a service, a patient, etc., directly to a business entity in real time. The DTBFCDMS provides the customer with a direct method to communicate with leaders of the business entity in a meaningful way. The DTBFCDMS implements a computer business process that requires at least one computer server and individual client databases and manages the client databases along with a customer component and an application component. The DTBFCDMS is not a publicly accessible system or a social media platform where the feedback is sent via a network, for example, the internet. The DTBFCDMS is a real time suggestion system platform for customers to provide their feedback comprising, for example, suggestions, directly to the business entity in a private system, where those suggestions are sent directly to the business entity. The DTBFCDMS implements a mobile application and a website application. The business entity connects to the DTBFCDMS and along with the DTBFCDMS has visibility into specific interactions. The DTBFCDMS provides a positive suggestion platform that allows customers to provide feedback, for example, frustrations and challenges that are experienced, and sends the feedback to the business entity. The DTBFCDMS implements a "how would you change this to make it better" question-based approach. The DTBFCDMS provides an opportunity to a customer to share an experience or an issue, an idea, an innovation, etc., with a leader in a business entity who could hear and review the issue, problem, etc., to resolve the issue, make a change, etc.

Figure 1:
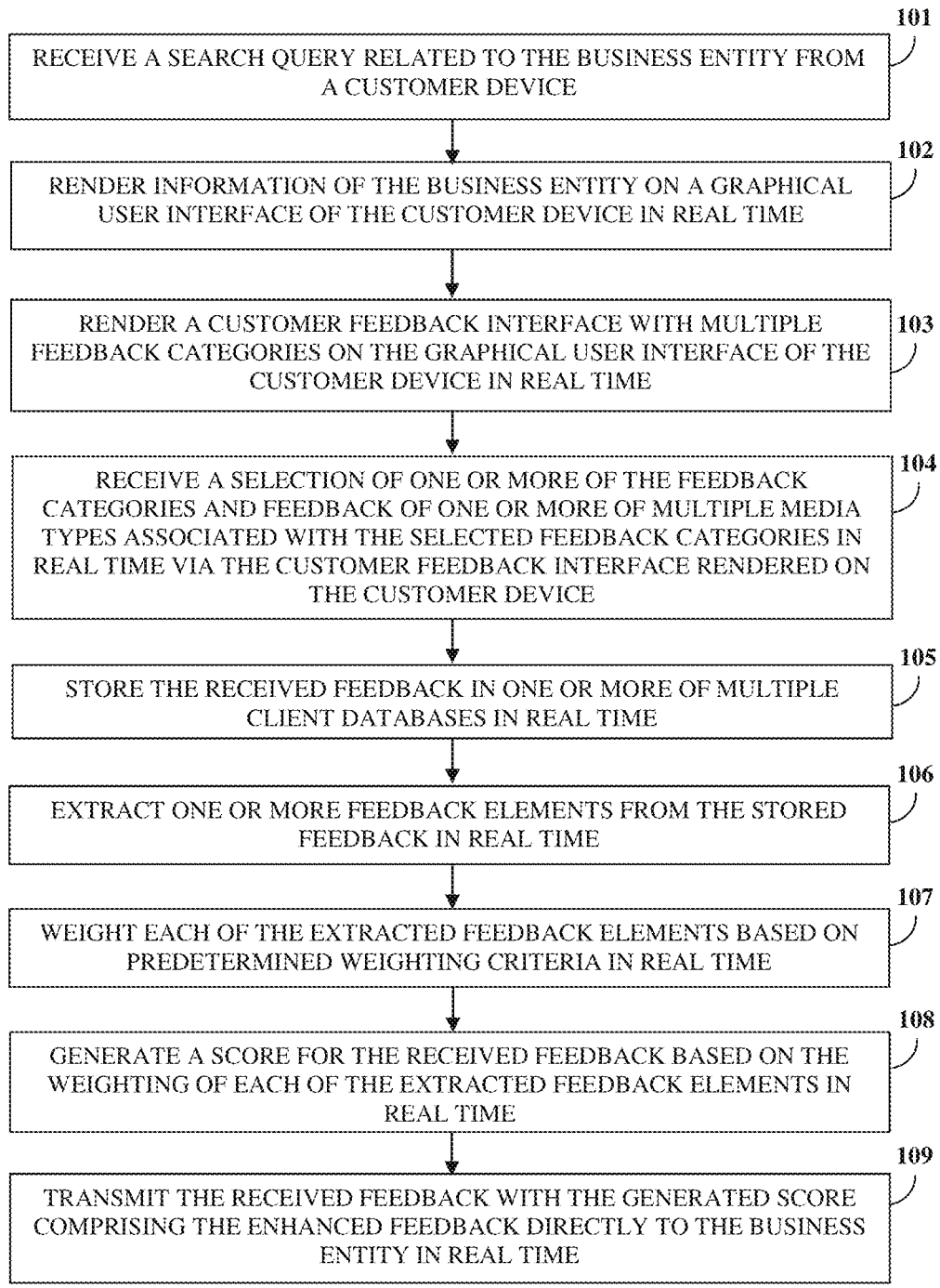
FIG. 1 illustrates a method for communicating enhanced feedback from a customer directly to a business entity in real time.

FIG. 1 illustrates a method for communicating enhanced feedback from a customer directly to a business entity in real time. The direct-to-business feedback communication and database management system (DTBFCDMS) receives 101 a search query related to the business entity from a customer device. The customer device is an electronic device, for example, one or more of a personal computer, a tablet computing device, a mobile computer, a mobile phone, a smart phone, a portable computing device, a laptop, a personal digital assistant, a wearable device such as the Google Glass® of Google Inc., the Apple Watch® of Apple Inc., the Android Smartwatch® of Google Inc., etc., a touch centric device, a workstation, a client device, a portable electronic device, a network enabled computing device, an interactive network enabled communication device, a gaming device, a television, an image capture device, a web browser, a portable media player, a disc player such as a Blu-ray Disc® player of the Blu-ray Disc Association, any other suitable computing equipment, combinations of multiple pieces of computing equipment, etc.

On receiving the search query related to the business entity, the direct-to-business feedback communication and database management system (DTBFCDMS) renders 102 information of the business entity on a graphical user interface of the customer device in real time. The DTBFCDMS renders 103 a customer feedback interface with multiple feedback categories on the graphical user interface of the customer device in real time. As used herein, "customer feedback interface" refers to a graphical user interface rendered by the client application on the customer device for acquiring information, for example, a search query related to a business entity, a selection of a feedback category, feedback, etc., from the customer via the customer device and displaying information, for example, feedback categories, location of the business entity, responses to the feedback from the business entity, etc., on the customer device. The customer feedback interface is, for example, a mobile application hosted by a web server of the DTBFCDMS. In an embodiment, the customer feedback interface is, for example, a mobile based downloadable application interface, a webpage of a website hosted by the web server of the DTBFCDMS, a web based downloadable application interface, etc.

The feedback categories rendered by the direct-to-business feedback communication and database management system (DTBFCDMS) on the customer feedback interface on the graphical user interface of the customer device comprise, for example, an improvement category, an innovation category, a challenge category, a praise category, etc. The DTBFCDMS allows customers to share an experience, for example, in one of four or more feedback categories, for example, an improvement, an idea or an innovation, a challenge, and praise, and with real time access to the business entity and leadership. The customer selects one or more of the feedback categories displayed on the customer device. The DTBFCDMS receives 104 the selection of one or more of the feedback categories and feedback of one or more of multiple media types associated with the selected feedback categories in real time via the customer feedback interface rendered on the customer device. The media types comprise, for example, text, image, audio, video, multimedia, etc., and any combination of the media types. In an embodiment, the DTBFCDMS prompts customers to register with the DTBFCDMS to communicate and share ideas, innovations, challenges, frustrations, and/or praises, etc. with the business entity.

The direct-to-business feedback communication and database management system (DTBFCDMS) stores 105 the received feedback in one or more of multiple client databases in real time. The DTBFCDMS extracts 106 one or more feedback elements from the stored feedback in real time. The DTBFCDMS weights 107 each of the extracted feedback elements based on predetermined weighting criteria in real time. The predetermined weighting criteria comprise, for example, importance, implementation, gamification, and incentivization. As used herein, "gamification" refers to the process of adding games or game like elements such as contests to the feedback elements. Also, as used herein, "incentivization" refers to providing incentives, for example, rewards, for providing the feedback or for participation in games or contests associated with the feedback. In an embodiment, the DTBFCDMS hosts suggestion contests conducted by business entities for providing incentives or rewards to customers, for example, on a daily basis, a weekly basis, a monthly basis, etc. If the contests are conducted on a weekly basis, then the business entity conducting the contests rewards the customer who provided the best suggestion of the week. In another embodiment, the DTBFCDMS hosts suggestion contests associated with a specific business issue. In another embodiment, the DTBFCDMS hosts suggestion contests to receive suggestions without a limitation regarding the type of the business issue and is therefore open to all suggestions.

The direct-to-business feedback communication and database management system (DTBFCDMS) generates 108 a score for the received feedback based on the weighting of each of the extracted feedback elements in real time. The DTBFCDMS applies the weighting criteria to each of the feedback elements to generate a score that is a weighted combination of the feedback elements. In an embodiment, the DTBFCDMS scores the weighing criteria, for example, from a one to five measurement system. The DTBFCDMS generates a score of one for feedback that is not urgent and does not require immediate intervention, and generates a score of five for feedback that is critical and requires an immediate intervention and response. In an embodiment, the DTBFCDMS uses an algorithm to categorize customer-acquired content, for example feedback, into negative and positive feedback and outputs the number of the negative feedback and the number of the positive feedback as percentages of the total number of feedback. For example, if there are fifty feedback, out of which the DTBFCDMS identifies thirty positive feedback and twenty negative feedback, the output of the algorithm would indicate 60% positive feedback and 40% negative feedback.

In an embodiment, the direct-to-business feedback communication and database management system (DTBFCDMS) comprises an artificial intelligence (AI) engine 201$y$ that applies natural language processing (NLP) to scan customer-acquired text, and picks out specific words or phrases to identify positive or negative emotions in the data. In an embodiment, the specific words or phrases picked out by the artificial intelligence (AI) engine is forwarded to the feedback processing module 201$m$ to technically process, execute and transform the specific words and/or phrases into another set of data by an algorithm in the computer program as follows. The feedback processing module 201$m$ identifies the meaning of the words. The feedback processing module 201$m$ then determines the meaning of the phrases by identifying the context of the phrases that comprise the words.

The DTBFCDMS then quantifies the results into an artificial intelligence quality score (AQS). The AI quality score is an example of the generated score that enhances the received feedback by quantifying it, enabling the business entity to take actionable decisions based on the enhanced feedback. Scoring the received feedback, allows the business entity to take actions concerning the received feedback appropriately.

The direct-to-business feedback communication and database management system (DTBFCDMS) transmits 109 the received feedback with the generated score comprising the enhanced feedback directly to the business entity in real time. The DTBFCDMS transmits the feedback to the business entity immediately, and also completely at the end of the day on receipt of the feedback from the customer. In an embodiment, a final input question sent to the customer feedback interface on the graphical user interface of the customer device asks how likely will the customer recommend the business entity to his or her friends and family. Based on the answer to the question and previous content acquired from the customer, the DTBFCDMS calculates a net promoter score (NPS). The DTBFCDMS subsequently performs an analysis incorporating the NPS into a unique experience opportunity score (EOS) with qualitative data identifying opportunities for improvement, training suggestions, and positive customer feedback to boost employee engagement at the business entity.

In an embodiment, the direct-to-business feedback communication and database management system (DTBFCDMS) renders an interaction option on the customer feedback interface for further communication on the received feedback between the business entity and the customer. The DTBFCDMS allows the business entity to reply to the received feedback, as the feedback is received in real time in one or more ways selected by the customer. In an embodiment, the DTBFCDMS provides analytics comprising, for example, trends in performance gaps, service excellence, etc., to the business entity. In another embodiment, the business entity employs the DTBFCDMS as a customized training tool for customizing the analytics based on a request from the business entity.

FIG. 2 exemplarily illustrates a system 200 comprising the direct-to-business feedback communication and database management system (DTBFCDMS) 201 for communicating enhanced feedback from a customer directly to a business entity in real time. The DTBFCDMS comprises at least one application computer server 201$a$, at least one processing computer server 201$c$, and at least one database computer server 201$e$. The application computer server 201$a$ comprises at least one processor 201$b$ for controlling a client application deployed on a customer device 202 exemplarily shown as a mobile phone 202$a$ or a personal computer 202$b$ and for rendering a customer feedback interface on the customer device 202. The application computer server 201$a$ executes control operations, for example, installing, operating, and hosting the client application on the customer device 202.

The processing computer server 201$c$ of the direct-to-business feedback communication and database management system (DTBFCDMS) 201 comprises at least one processor 201$d$ communicatively coupled to the application computer server 201$a$ via a network 201$g$. The network 201$g$ is, for example, one of the internet, an intranet, a wired network, a wireless network, a communication network that implements Bluetooth® of Bluetooth Sig, Inc., a network that implements Wi-Fi® of Wi-Fi Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, etc., a local area network, a wide area network, an internet connection network, an infrared communication network, etc., or a network formed from any combination of these networks.

In an embodiment, the direct-to-business feedback communication and database management system (DTBFCDMS) 201 uses programmed and purposeful hardware. The DTBFCDMS 201 is implemented on a computing device, for example, a personal computer, a tablet computing device, a mobile computer, a portable computing device, a laptop, a touch device, a workstation, a server, a portable electronic device, a network enabled computing device, an interactive network enabled communication device, any other suitable computing equipment, combinations of multiple pieces of computing equipment, etc. In an embodiment, the computing equipment is used to implement applications such as media playback applications, a web browser, an electronic mail (email) application, a calendar application, etc. In another embodiment, the computing equipment, for example, has one or more servers associated with one or more online services. In an embodiment, the DTBFCDMS 201 is configured as a web based platform, for example, a website hosted on a server or a network of servers.

The direct-to-business feedback communication and database management system (DTBFCDMS) 201 communicates with customer devices 202 via the network 203, for example, a short range network or a long range network. The user devices 202 comprising, as exemplarily shown 202a or 202b, are electronic devices, for example, personal computers, tablet computing devices, mobile computers, mobile phones, smartphones, portable computing devices, personal digital assistants, laptops, wearable computing devices such as the Google Glass® of Google Inc., the Apple Watch® of Apple Inc., etc., touch centric devices, client devices, portable electronic devices, network enabled computing devices, interactive network enabled communication devices, any other suitable computing equipment, combinations of multiple pieces of computing equipment, etc. In an embodiment, the customer devices 202 are hybrid computing devices that combine the functionality of multiple devices. Examples of a hybrid computing device comprise a cellular telephone that includes a media player functionality, a gaming device that includes a wireless communications capability, a cellular telephone that includes a document reader and multimedia functions, and a portable device that has network browsing, document rendering, and network communication capabilities.

The network 203, similar to the network 201g, can be a wired, a wireless, or a combination of networks using different protocols. In an embodiment, the direct-to-business feedback communication and database management system (DTBFCDMS) 201 is accessible to the customer devices 202, for example, through a broad spectrum of technologies and devices such as cellular phones, tablet computing devices, etc., with access to the internet.

As exemplarily illustrated in FIG. 2, the direct-to-business feedback communication and database management system (DTBFCDMS) 201 comprises a non-transitory computer readable storage medium, for example, a memory unit 201i for storing programs and data, and at least one processor 201d of the processing computer server 201c communicatively coupled to the non-transitory computer readable storage medium. As used herein, "non-transitory computer readable storage medium" refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to the processor 201d. The non-transitory computer readable storage medium is configured to store computer program instructions defined by modules, for example, 201j, 201k, 201l, 201m, 201n, etc., of the DTBFCDMS 201. The modules 201j, 201k, 201l, 201m, and 201n are installed and stored in the memory unit 201i of the DTBFCDMS 201. The memory unit 201i is used for storing program instructions, applications, and data. The memory unit 201i is, for example, a random access memory (RAM) or another type of dynamic storage device that stores information and instructions for execution by the processor 201d. The memory unit 201i also stores temporary variables and other intermediate information used during execution of the instructions by the processor 201d. The DTBFCDMS 201 further comprises a read only memory (ROM) or another type of static storage device that stores static information and instructions for the processors 201b, 201d, and 201f.

The processor 201d is configured to execute the computer program instructions defined by the modules, for example, 201j, 201k, 201l, 201m, 201n, etc., of the direct-to-business feedback communication and database management system (DTBFCDMS) 201. The processors 201b, 201d, and 201f refer to any of one or more microprocessors, central processing unit (CPU) devices, finite state machines, computers, microcontrollers, digital signal processors, logic, logic devices, user circuits, application specific integrated circuits (ASIC), field-programmable gate arrays (FPGA), chips, etc., or any combination thereof, capable of executing computer programs or a series of commands, instructions, or state transitions. In an embodiment, the processors 201b, 201d, and 201f are implemented as processor sets comprising, for example, programmed microprocessors and math or graphics co-processors. The processors 201b, 201d, and 201f are selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The DTBFCDMS 201 disclosed herein is not limited to employing a processor 201m. In an embodiment, the DTBFCDMS 201 employs controllers or microcontrollers.

As exemplarily illustrated in FIG. 2, the direct-to-business feedback communication and database management system (DTBFCDMS) 201 further comprises a data bus 201p, a network interface 201q, an input/output (I/O) controller 201r, input devices 201s, a fixed media drive 201t such as a hard drive, a removable media drive 201u for receiving removable media, output devices 201v, etc. The data bus 201p permits communications between the modules, for example, 201j, 201k, 201l, 201m, 201n, etc., of the DTBFCDMS 201. The network interface 201q enables connection of the DTBFCDMS 201 to the network 203. In an embodiment, the network interface 201q is provided as an interface card also referred to as a line card. The network interface 201q comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on a transmission control protocol (TCP)/internet protocol (IP), interfaces based on wireless communications technology such as satellite technology, radio frequency (RF) technology, near field communication, etc. The I/O controller 201r controls input actions and output actions performed by the DTBFCDMS 201.

The display screen 201w, via the graphical user interface (GUI) 201x, displays content of files, display interfaces, user interface elements such as chat windows, etc. The display screen 201w is, for example, a video display, a liquid crystal display, a plasma display, an organic light emitting diode (OLED) based display, etc. The direct-to-business feedback communication and database management system (DTBFCDMS) 201 provides the GUI 201x on the display screen 201w. The GUI 201x is, for example, an online web interface, a web based downloadable application interface, a mobile based downloadable application interface, etc. The display screen 201w displays the GUI 201x. The input devices 201s are used for inputting data into the DTBFCDMS 201 for routine maintenance of the DTBFCDMS 201. The input devices 201s are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc. The output devices 201v output the results of operations performed by the DTBFCDMS 201.

The processor 201d of the processing computer server 201c is configured to execute computer program instructions defined by modules of the direct-to-business feedback communication and database management system (DTBFCDMS) 201. The modules of the DTBFCDMS 201 comprise a search engine 201j, a feedback communication module 201k, a feedback storage module 201l, a feedback processing module 201m, and a feedback scoring module 201n. The search engine 201j receives a search query related to the business entity from the customer device 202 and renders information of the business entity on a graphical user interface of the customer device 202. The feedback communication module 201k renders multiple feedback categories on the customer feedback interface displayed on the customer device 202. The feedback categories are as disclosed in the detailed description of FIG. 1. The customer selects one or more of the feedback categories displayed on the customer device. The feedback communication module 201k receives the selected feedback categories and feedback of one or more of multiple media types associated with the selected feedback categories from the customer device via the customer feedback interface on the customer device. The media types are as disclosed in the detailed description of FIG. 1. In an embodiment, the DTBFCDMS 201 prompts customers to register with the DTBFCDMS 201 to communicate and share ideas, innovations, challenges, frustrations, and/or praises, etc. with the business entity.

The feedback storage module 201l stores the received feedback in one or more of multiple client databases 201h accessed by the database computer server 201e of the direct-to-business feedback communication and database management system (DTBFCDMS) 201. The feedback processing module 201m extracts feedback elements from the stored feedback and weights each of the feedback elements based on a predetermined weighting criteria. The predetermined weighting criteria comprise, for example, a prioritization of importance, implementation, gamification, and incentivization of the received feedback, etc. In an embodiment, the feedback processing module 201m uses an algorithm and an artificial intelligence (AI) engine 201y to categorize customer-acquired content into negative and positive feedback, and outputs the number of the negative and the number of the positive feedback as percentages of the total number of suggestions as disclosed in the detailed description of FIG. 1. The feedback communication module 201k of the DTBFCDMS 201 renders options to categorize a feedback as a positive feedback, or a negative feedback. The positive and negative feedback received for a business entity are displayed as percentages of total feedback received for the business entity.

In an embodiment, the feedback processing module 201m may also allow a customer to categorize a feedback as neutral, and the feedback communication module 201k will display the neutral feedback as a percentage of the total feedback received for the business entity.

In an embodiment, the artificial intelligence (AI) engine 201y applies natural language processing (NLP) to scan customer-acquired text, and picks out specific words or phrases to identify positive or negative emotions in the data. The specific words or phrases picked out by the artificial intelligence (AI) engine is forwarded to the feedback processing module 201m to technically process, execute and transform the specific words and/or phrases into another set of data by the algorithm in the computer program as follows. The feedback processing module 201m identifies the meaning of the words. The feedback processing module 201m then determines the meaning of the phrases by identifying the context of the phrases that comprise the words. The feedback processing module 201m compares the words and/or phrases with training data present in the database 201o. As used herein, training data refers to words and/or phrases with pre-assigned values. The pre-assigned values enable the feedback processing module 201m to determine whether a particular word and/or phrase is associated with a positive feedback or a negative feedback. The feedback processing module 201m identifies the context of usage of a particular word and/or phrase to determine whether the particular word and/or phrase is associated with a positive feedback or a negative feedback. In an embodiment, the feedback processing module 201m provides the pre-assigned values of the particular word and/or phrase to the feedback scoring module 201n.

The feedback scoring module 201n generates a score for the received feedback based on the weighting of each of the feedback elements. In an embodiment, the feedback scoring module 201n quantifies results produced by the feedback processing module 201m into an artificial intelligence quality score (AQS) that it outputs. In an embodiment, the feedback communication module 201k sends a question to the customer feedback interface on the graphical user interface of the customer device asking the customer how likely will the customer recommend the business entity to his or her friends and family. In the embodiment, based on the answer to the question and previous content acquired from the customer, the feedback scoring module 201n calculates a net promoter score (NPS), which it analyzes to output a unique experience opportunity score (EOS) with qualitative data identifying opportunities for improvement, training suggestions, and positive customer stories to boost employee engagement at the business entity. The feedback communication module 201k transmits the received feedback with the generated score directly to the business entity. In an embodiment, the feedback communication module 201k renders an interaction option on the customer feedback interface for further communication on the received feedback between the business entity and the customer as disclosed in the detailed description of FIG. 1.

The database 201o and the one or more client databases 201h of the direct-to-business feedback communication and database management system (DTBFCDMS) 201 can be any storage area or media that can be used for storing data and files. In an embodiment, the DTBFCDMS 201 stores the received feedback in external databases, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase™ database of the Apache Software Foundation, etc. In another embodiment, the database 201$o$ and the one or more client databases 201$h$ can be locations on a file system. In another embodiment, the database 201$o$ and the one or more client databases 201$h$ can be remotely accessed by the DTBFCDMS 201 via the network 203. In another embodiment, the database 201$o$ and the one or more client databases 201$h$ are configured as cloud-based databases implemented in a cloud computing environment, where computing resources are delivered as a service over the network 203.

Computer applications and programs are used for operating the modules of the direct-to-business feedback communication and database management system (DTBFCDMS) 201. The programs are loaded onto the fixed media drive 201$t$ and into the memory unit 201$i$ of the DTBFCDMS 201 via the removable media drive 201$u$. In an embodiment, the computer applications and programs are loaded directly on the DTBFCDMS 201 via the network 203. The processors 201$b$, 201$d$, and 201$f$ each execute an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., etc. The DTBFCDMS 201 employs the operating system for performing multiple tasks. The operating system is responsible for management and coordination of activities and sharing of resources of the DTBFCDMS 201. The operating system further manages security of the DTBFCDMS 201, peripheral devices connected to the DTBFCDMS 201, and network connections. The operating system employed on the DTBFCDMS 201 recognizes, for example, inputs provided by a user of the DTBFCDMS 201 using one of the input devices 201$s$, the output devices 201$v$, files, and directories stored locally on the fixed media drive 201$t$. The operating system on the DTBFCDMS 201 executes different programs using the processors 201$b$, 201$d$, and 201$f$. The processors 201$b$, 201$d$, and 201$f$ and the operating system together define a computer platform for which application programs in high level programming languages are written.

The processor 201$d$ of the processing computer server 201$c$ of the direct-to-business feedback communication and database management system (DTBFCDMS) 201 retrieves instructions defined by the search engine 201$j$, the feedback communication module 201$k$, the feedback storage module 201$l$, the feedback processing module 201$m$, and the feedback scoring module 201$n$ for performing respective functions disclosed above. The processor 201$d$ retrieves instructions for executing the modules, for example, 201$j$, 201$k$, 201$l$, 201$m$, 201$n$, etc., of the DTBFCDMS 201 from the memory unit 201$i$. A program counter determines the location of the instructions in the memory unit 201$i$. The program counter stores a number that identifies the current position in the program of each of the modules, for example, 201$j$, 201$k$, 201$l$, 201$m$, 201$n$, etc., of the DTBFCDMS 201. The instructions fetched by the processor 201$d$ from the memory unit 201$i$ after being processed are decoded. The instructions are stored in an instruction register in the processor 201$d$. After processing and decoding, the processor 201$d$ executes the instructions, thereby performing one or more processes defined by those instructions.

At the time of execution, the instructions stored in the instruction register are examined to determine the operations to be performed. The processor 201$d$ then performs the specified operations. The operations comprise arithmetic operations and logic operations. The operating system performs multiple routines for performing a number of tasks required to assign the input devices 201$s$, the output devices 201$v$, and the memory unit 201$i$ for execution of the modules, for example, 201$j$, 201$k$, 201$l$, 201$m$, 201$n$, etc., of the direct-to-business feedback communication and database management system (DTBFCDMS) 201. The tasks performed by the operating system comprise, for example, assigning memory to the modules, for example, 201$j$, 201$k$, 201$l$, 201$m$, 201$n$, etc., of the DTBFCDMS 201 and to data used by the DTBFCDMS 201, moving data between the memory unit 201$i$ and disk units, and handling input/output operations. The operating system performs the tasks on request by the operations and after performing the tasks, the operating system transfers the execution control back to the processor 201$d$. The processor 201$d$ continues the execution to obtain one or more outputs. The outputs of the execution of the modules, for example, 201$j$, 201$k$, 201$l$, 201$m$, 201$n$, etc., of the DTBFCDMS 201 are displayed to a user of the DTBFCDMS 201 on the output device 201$v$. In an embodiment, one or more portions of the DTBFCDMS 201 are distributed across one or more computer systems (not shown) coupled to the network 203. A code snippet of the feedback processing module 201$m$ executed by the processor 201$d$ of the DTBFCDMS 201 for processing the received feedback is disclosed below:

```
]sugezt-master/Sugezt/view
controllers/entry/RegisterEmailViewController.swiftUT
    È
```

```
\PK
            ;}M‡ŸÿžC
    R* :                           G°]sugezt-
master/Sugezt/view
controllers/entry/SignUpVC.swiftUT È
```

```
\PK
                ;}M           /         ëÅ]sugezt-
master/Sugezt/view
controllers/feedback/UT È
```

```
\PK
            ; }MQøáæ       [ U        AÆ]sugezt-
master/Sugezt/view
```

```
controllers/feedback/FeedbackSubmissionViewController
.swiftUT È

\PK
          ;}MRµ'              †% A        £Í]sugezt
-master/Sugezt/view
controllers/feedback/FeedbackView.swiftUT È

\PK
          ;}MÊ=z"6
    6;   ?                    $×]sugezt-
master/Sugezt/view
controllers/feedback/FeedbackView.xibUT È

\PK
                  ;}M       3       Àã]sugezt-
master/Sugezt/view controllers/page
control/UT È

\PK
              ;}Mùˆw
,    [_____    L                ä]sugezt
-master/Sugezt/view controllers/page
control/Page1ViewController.swiftUT È

\PK
              ;}M%¨;ë,    [_____ L
    Eæ]sugezt-master/Sugezt/view controllers/page
control/Page2ViewController.swiftUT È

\PK
              ;}M·´,   [_____  L
    pè]sugezt-master/Sugezt/viewcontrollers/page
control/Page3ViewController.swiftUT È

\PK
              ;}MØ< Ÿ      q&    L      >ê]sugezt
-master/Sugezt/view controllers/page
control/Page4ViewController.swiftUT È

\PK
              ;}MèúœH_____   Õ
    K                 i]sugezt-master/Sugezt/view
controllers/page
control/PageViewController.swiftUT È

\PK
              ;}M         /        9ñ]sugezt-
master/Sugezt/view
controllers/tutorial/UT È

\PK
              ;}MËË§,
    L                ñ]sugezt-master/Sugezt/view
controllers/tutorial/Tutorial1ViewController.swiftUT
È

\PK
              ;}M³[Â[Ô   ƒ_____   L
ô]sugezt-master/Sugezt/view
controllers/tutorial/Tutorial2ViewController.swiftUT
È

\PK
              ;}M> èt,  €
    L           Qö]sugezt-master/Sugezt/view
controllers/tutorial/Tutorial3ViewController.swiftUT
È

\PK   EEO đø](81e08164b2be9087472a14356b70f9c1ef6bf
d7d
                  Back-End Code
[PK
          =2}M'»æGs      ¢_____    1
          åú sugezt-backend-
master/spec/apis/v1/images_spec.rbUT ōÿ[PK
          =2}MU¨[`T    ù   3          °ü sugezt-
```

-continued

```
backend-
master/spec/apis/v1/messages_spec.rbUT õÿ[PK
            =2}M(àç
š ñ_____ 3                              ŷ sugez
t-backend-
master/spec/apis/v1/sessions_spec.rbUT õÿ[PK
            =2}M<K5Ñ¢      °      0         Rsugezt
-backend-master/spec/apis/v1/users_spec.rbUT õÿ[PK
            =2}M                %       K sugezt-backend-master/spec/factories/UT õÿ[PK
            =2}McC
ù°_____            O   .                - sugezt-backend-
master/spec/factories/images.rbUT õÿ[PK
            =2}MěŒÚ§       ý    0            |sugezt-
backend-master/spec/factories/messages.rbUT õÿ[PK
            =2}M7&¥w        ñ    -
                            ¤       sugezt-backend-
master/spec/factories/users.rbUT õÿ[PK
            =2}M                 "          -
sugezt-backend-master/spec/models/UT õÿ[PK
            =2}MUGŽ¬/      / /            á
sugezt-backend-
master/spec/models/image_spec.rbUT õÿ[PK
            =2}M»Ȼ>l,
    1                             f
sugezt-backend-
master/spec/models/message_spec.rbUT õÿ[PK
            =2}Ms/MS    Z   .         @
sugezt-backend-
master/spec/models/user_spec.rbUT õÿ[PK
            =2}MEdÁöÍ_____ v *
    è
sugezt-backend-master/spec/rails_helper.rbUT õÿ[PK
            =2}M Ú,øb      ™  )       sugezt-backend-
master/spec/spec_helper.rbUT õÿ[PK
            =2}M                 #     ,sugezt-
backend-master/spec/support/UT õÿ[PK
            =2}MÀù¨ ®Ù        J 0     sugezt-
backend-master/spec/support/api_helper.rbUT õÿ[PK
            =2}M                       2sugezt-
backend-master/tmp/UT õÿ[PK
            =2}M                         ssugezt-
backend-master/tmp/.keepUT õÿ[PK
            =2}M                         ¹sugezt-
backend-master/vendor/UT õÿ[PK
            =2}M                 "      ýsugezt-
backend-
master/vendor/.keepUT õÿ[PK    ž ž d=   F(45a98820361f
f6d9f3daee106152b60a620d2bde
```

The non-transitory computer readable storage medium disclosed herein stores computer program codes comprising instructions executable by at least one processor 201*d* for communicating enhanced feedback from a customer directly to a business entity in real time. The computer program codes comprise a first computer program code for receiving a search query related to the business entity from a customer device 202; a second computer program code for rendering information of the business entity on a graphical user interface of the customer device 202 in real time; a third computer program code for rendering a customer feedback interface with a plurality of feedback categories on the graphical user interface of the customer device 202 in real time, wherein the feedback categories comprise an improvement category, an innovation category, a challenge category, and a praise category; a fourth computer program code for receiving a selection of one or more of the feedback categories and feedback of one or more of multiple media types associated with the selected feedback categories based on the selection from the customer device 202 in real time via the customer feedback interface rendered on the customer device 202, where the media types comprise text, image, audio, video, multimedia, and any combination of these media types; a fifth computer program code for storing the received feedback in one or more of multiple client databases 201*h* in real time; a sixth computer program code for extracting one or more feedback elements from the stored feedback in real time; a seventh computer program code for weighting each of the extracted feedback elements based on predetermined weighting criteria in real time, where the predetermined weighting criteria comprise importance, implementation, gamification, and incentivization, and where, in an embodiment, the weighting of the extracted feedback elements comprises categorizing feedback such as suggestions into percentages of positive and negative suggestions; an eighth computer program code for generating a score for the received feedback based on the weighting of each of the extracted feedback elements in real time, where, in an embodiment, the generated score comprises an artificial intelligence quality score (AQS), and correspondingly, a net promoter score (NPS), which the eighth computer program code analyzes to output a unique experience opportunity score (EOS) as disclosed in the detailed description of FIG. 1; and a ninth computer program code for transmitting the received feedback with the generated score comprising the enhanced feedback directly to the business entity in real time.

In an embodiment, the ninth computer program code comprises a tenth computer program code for rendering an interaction option on the customer feedback interface for further communication on the received feedback between the business entity and the customer. The computer program codes further comprise one or more additional computer program codes for performing additional steps that may be required and contemplated for communicating enhanced feedback from a customer directly to a business entity in real time. In an embodiment, a single piece of computer program code comprising computer executable instructions performs one or more steps of the method disclosed herein for communicating enhanced feedback from a customer directly to a business entity in real time. The computer program codes comprising computer executable instructions are embodied on the non-transitory computer readable storage medium. The processor 201d of the processing computer server 201c retrieves these computer executable instructions and executes them. When the computer executable instructions are executed by the processor 201d, the computer executable instructions cause the processor 201d to perform the steps of the method for communicating enhanced feedback from a customer directly to a business entity in real time.

Figure 3A:
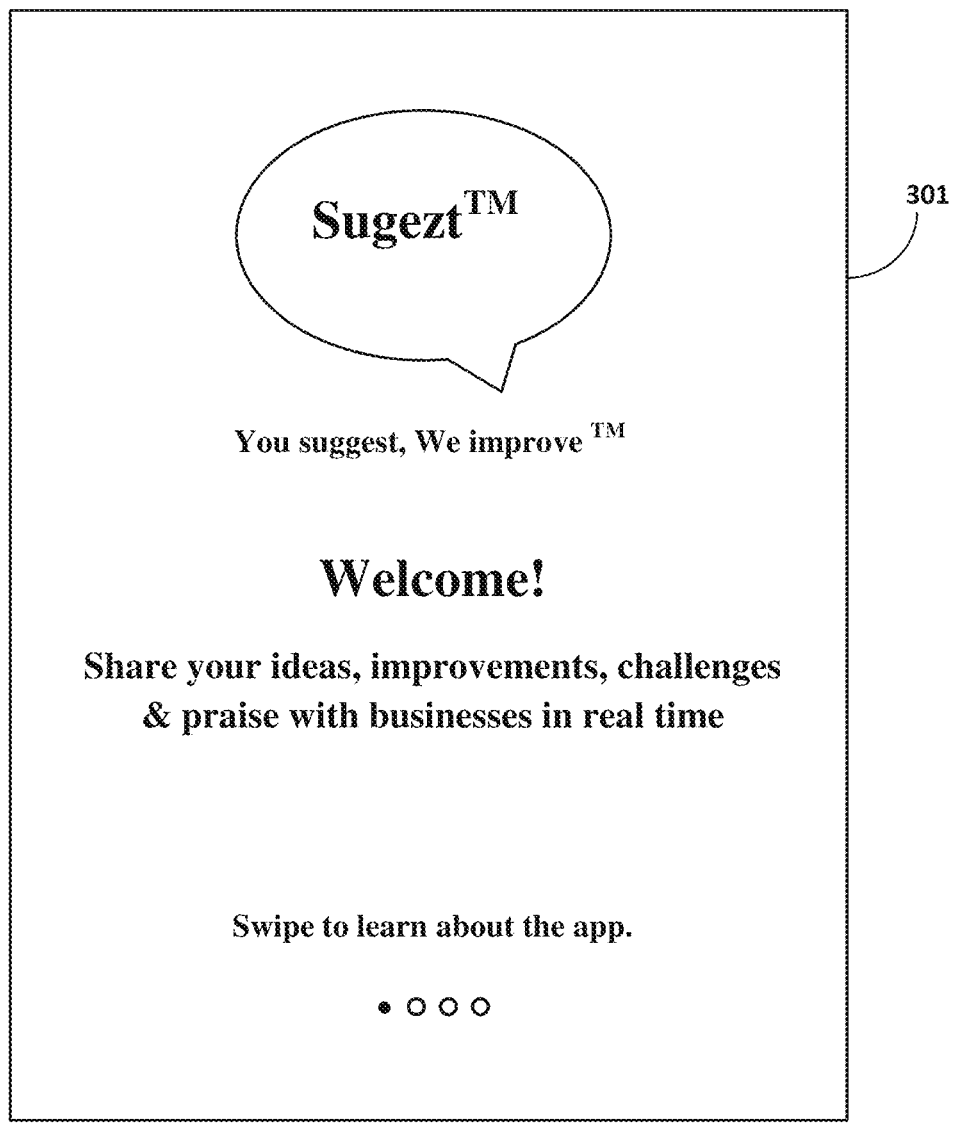
FIGS. 3A-3S exemplarily illustrate screenshots of graphical user interfaces rendered by a direct-to-business feedback communication and database management system on a customer device for communicating feedback from a customer to a business entity directly in real time.
Figure 3B:
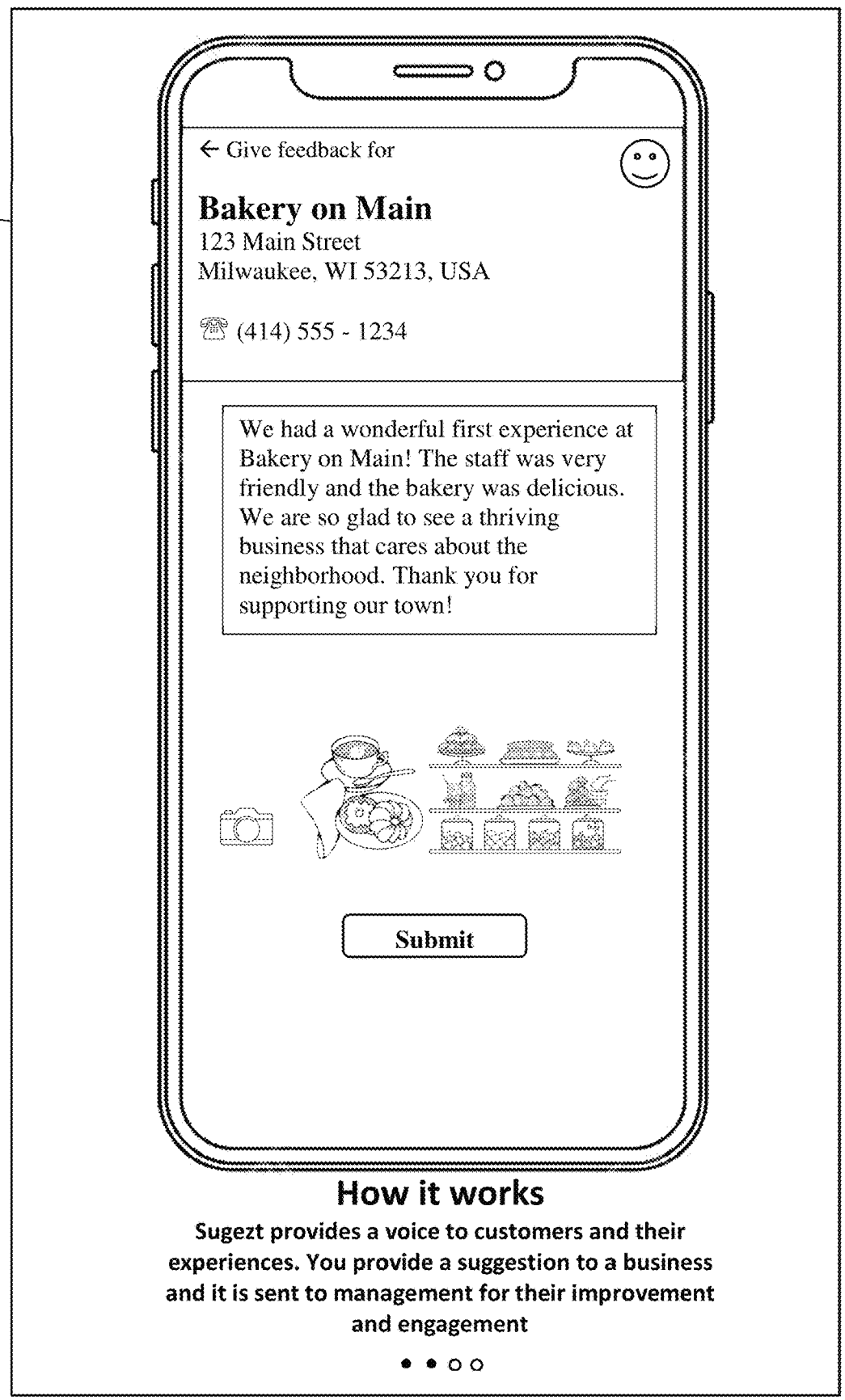
Figure 3E:
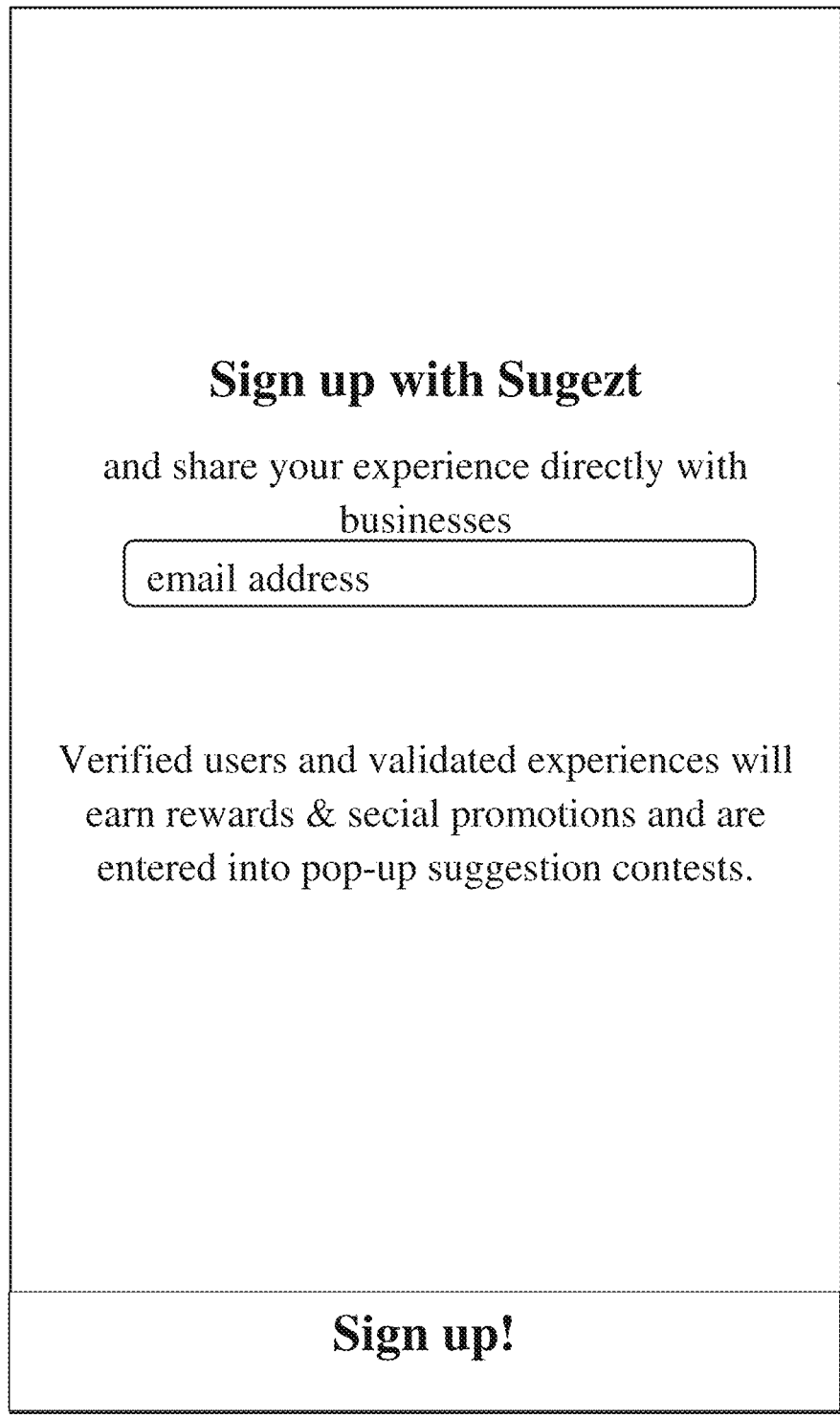
Figure 3F:
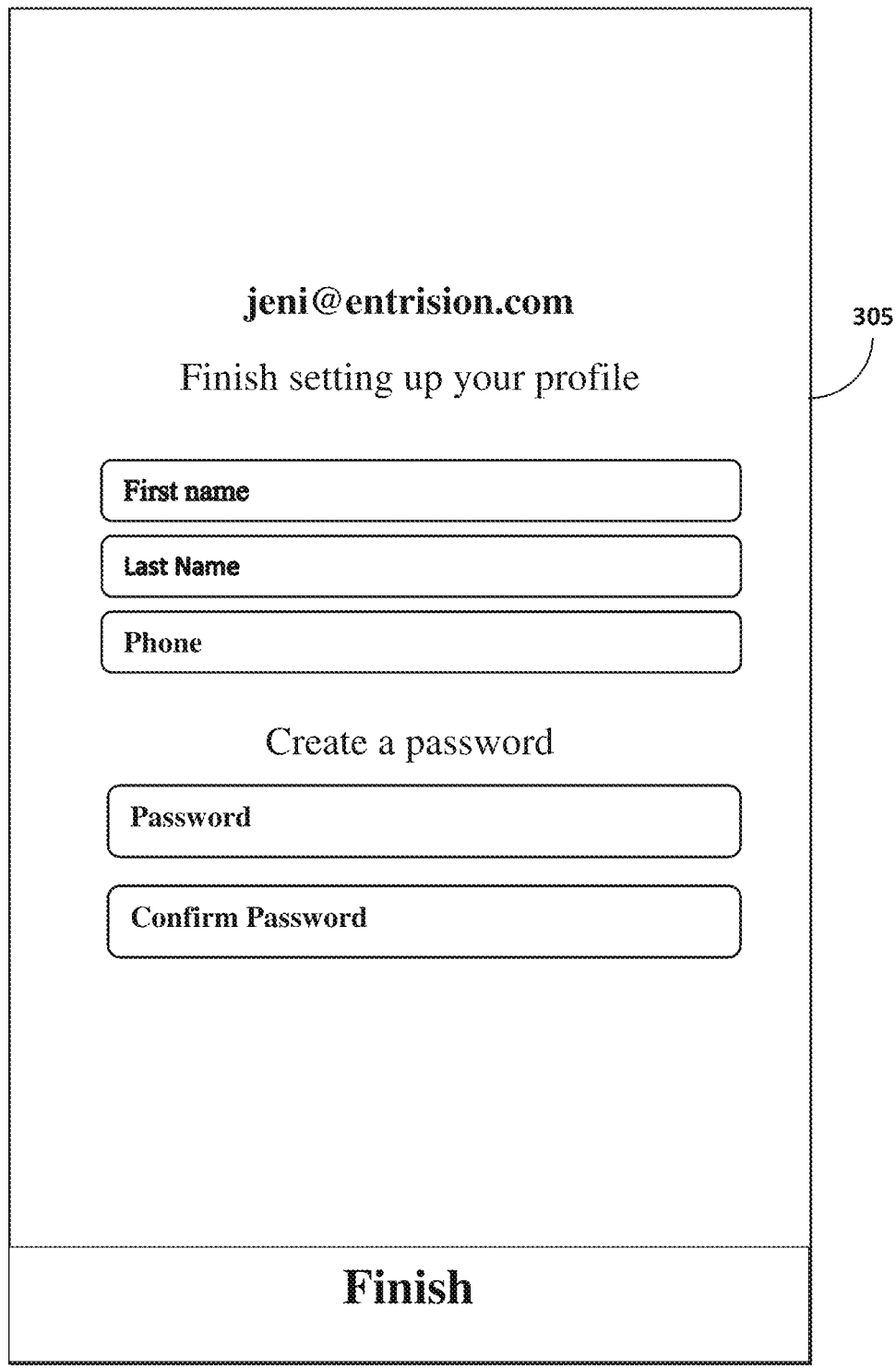
Figure 3G:
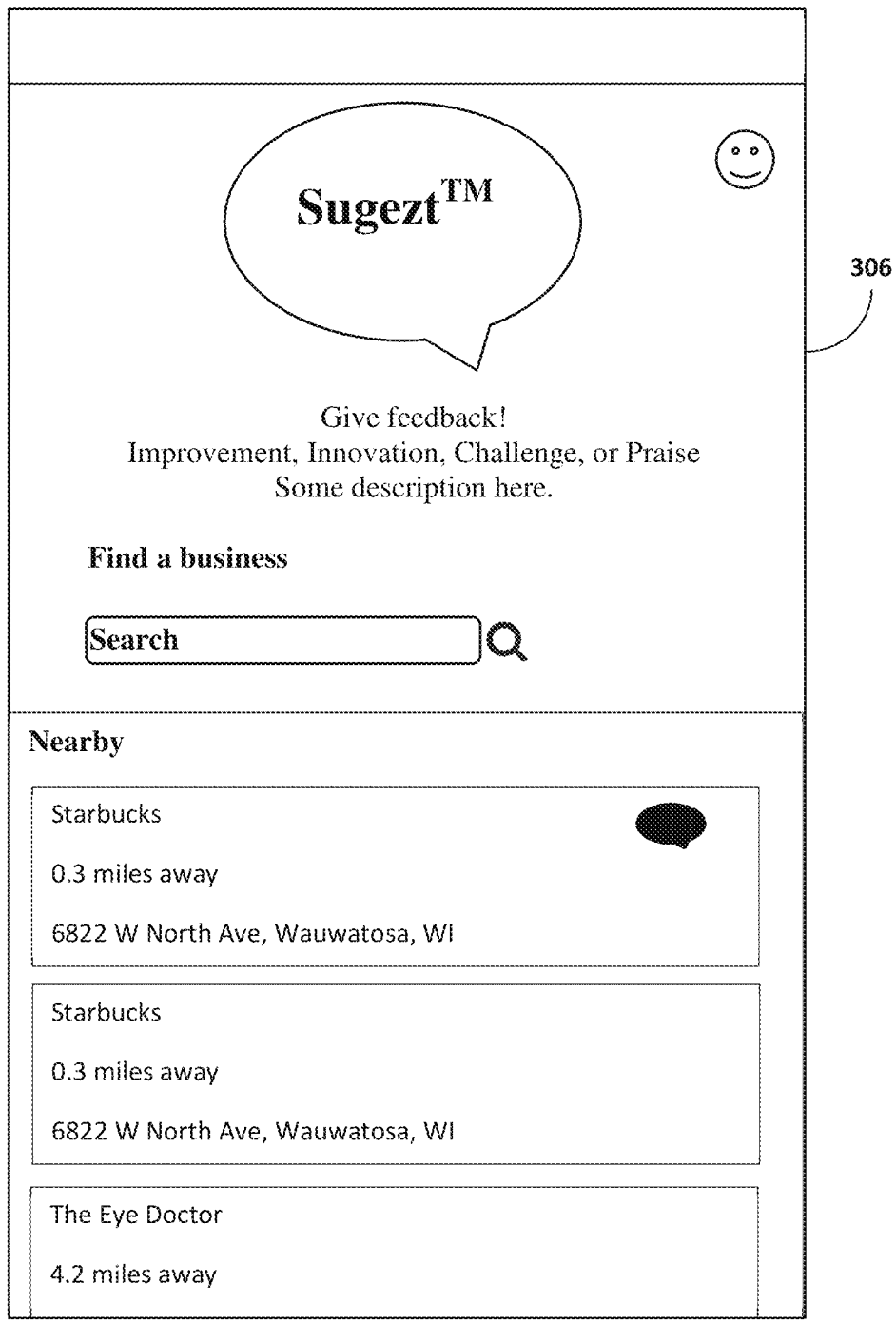
Figure 3H:
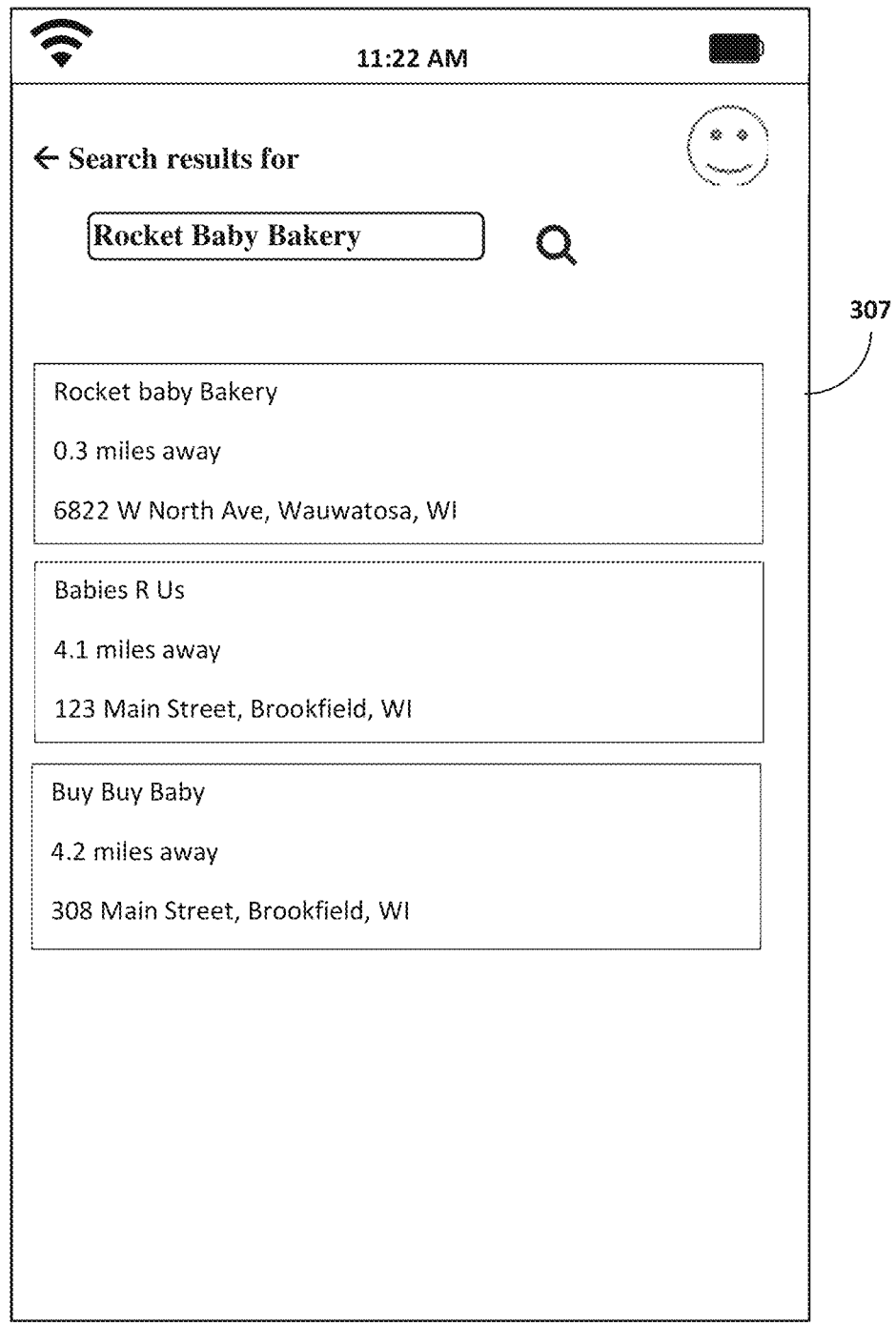
Figure 3I:
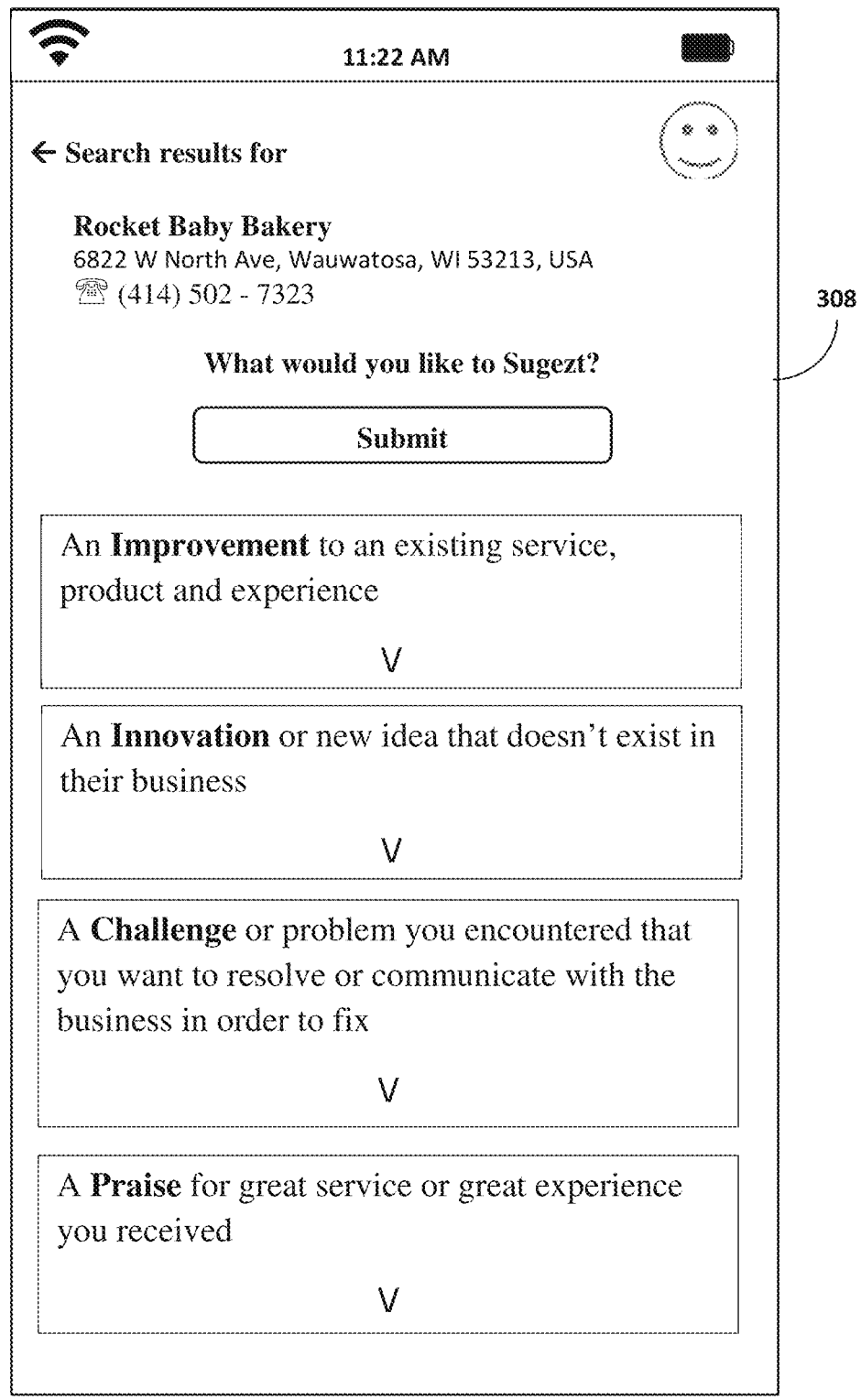
Figure 3J:
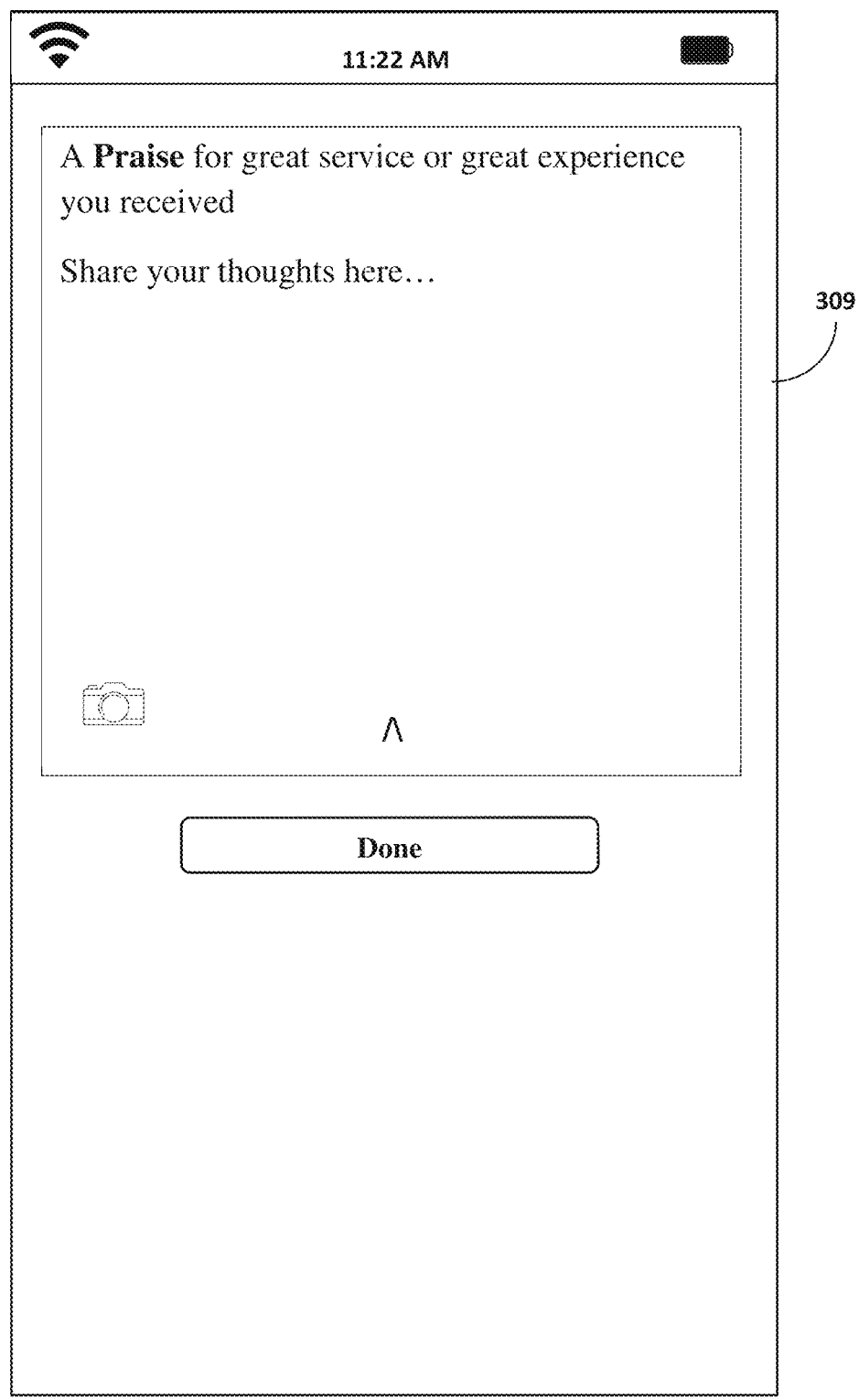
Figure 3K:
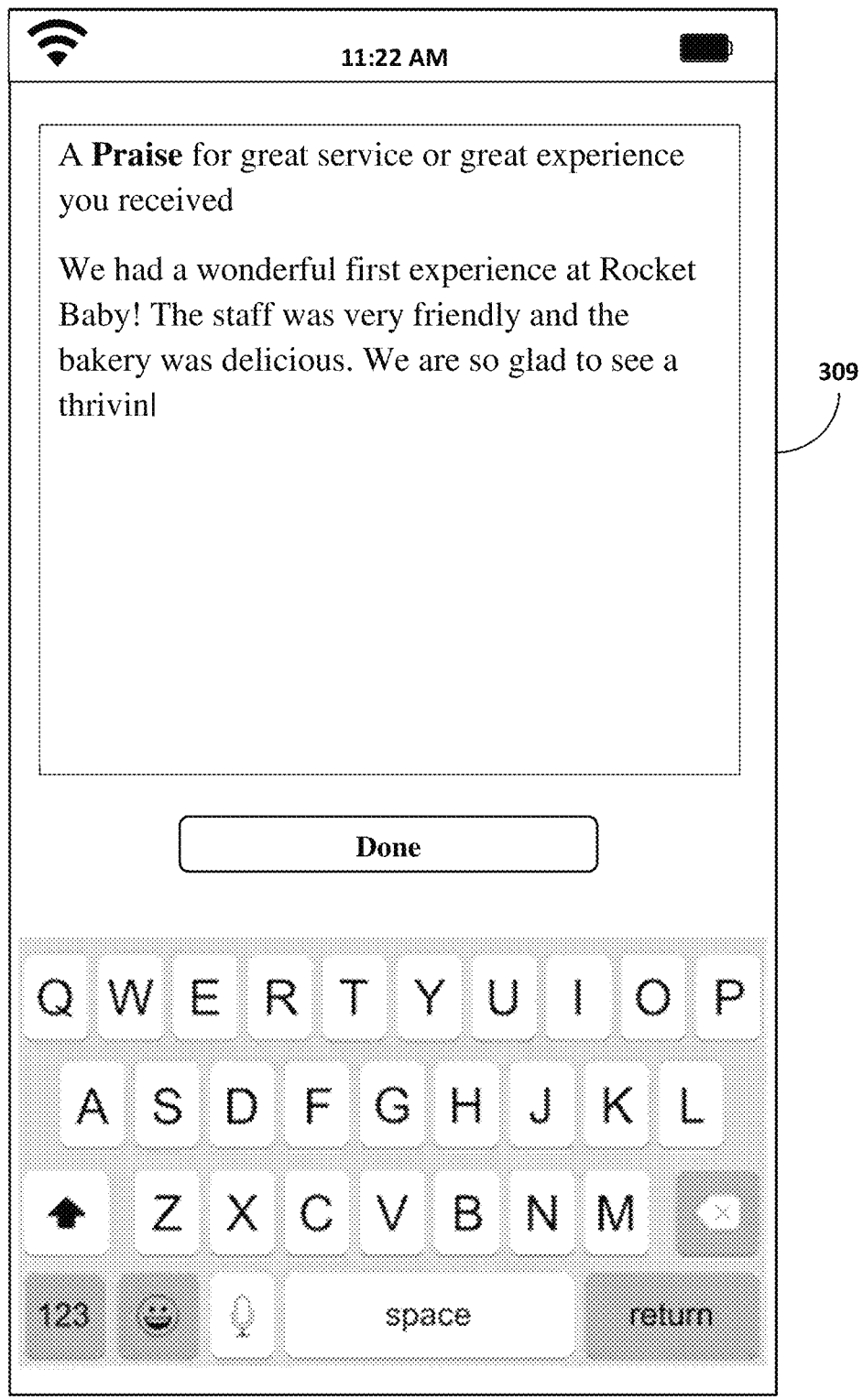
Figure 3L:
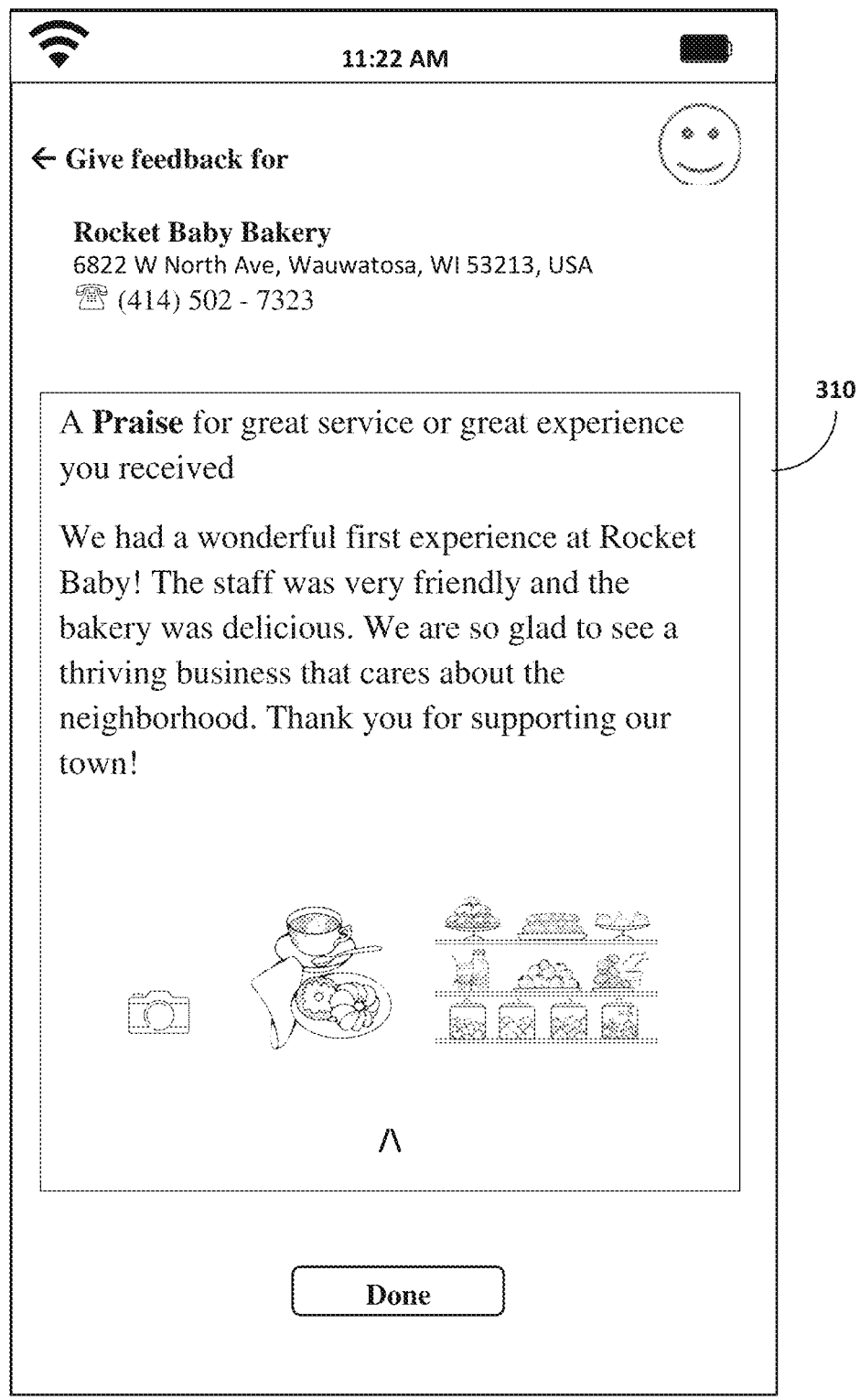
Figure 3M:
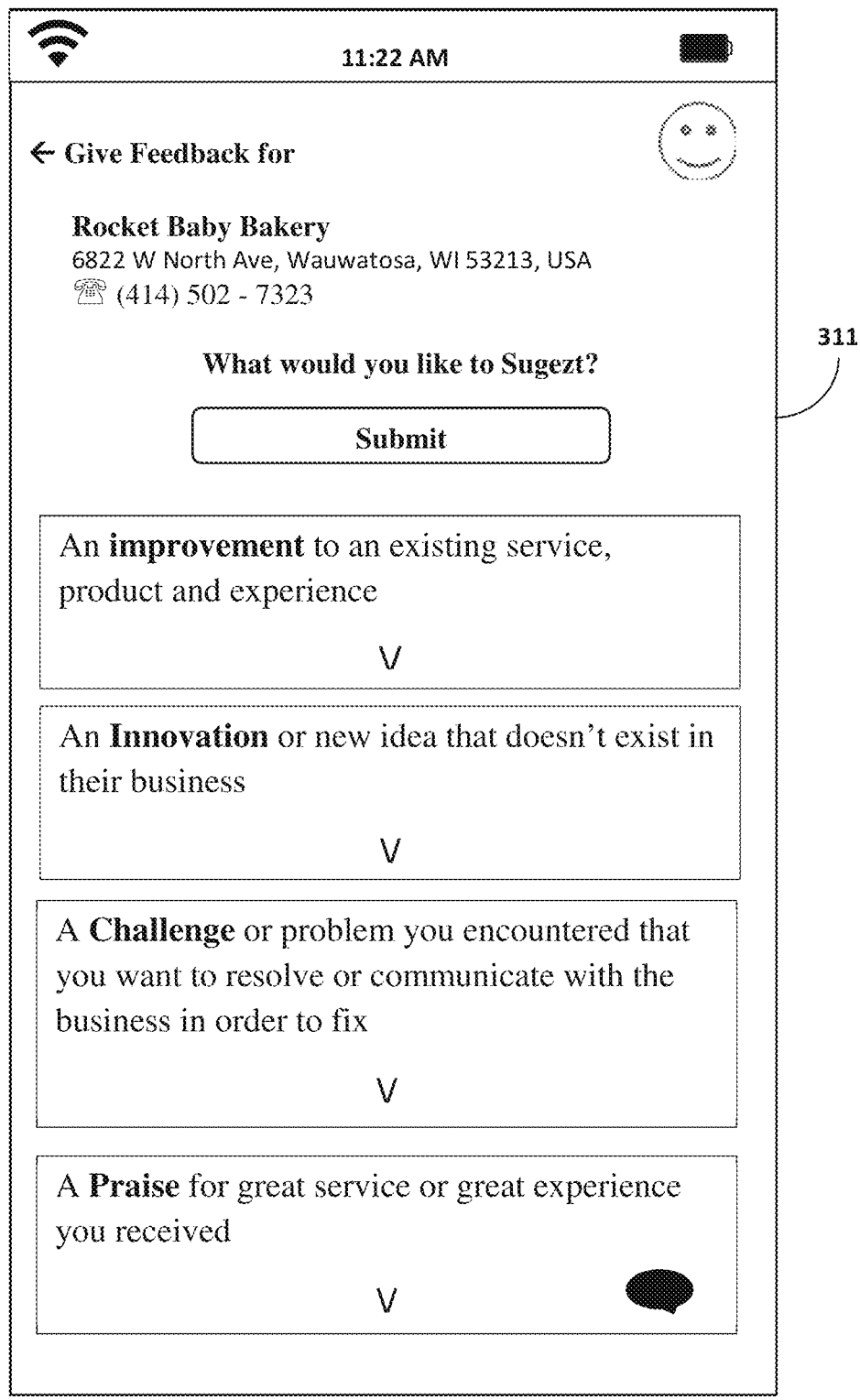
Figure 3N:
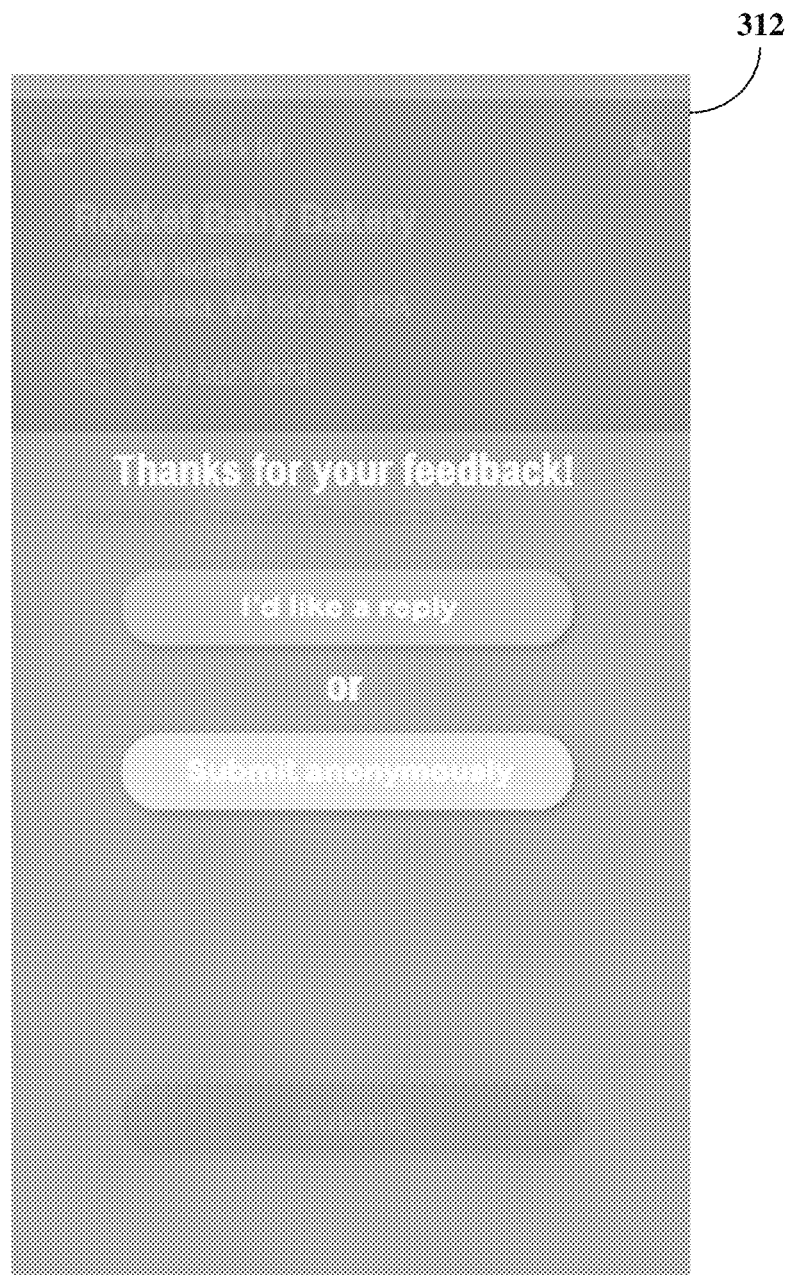
Figure 3O:
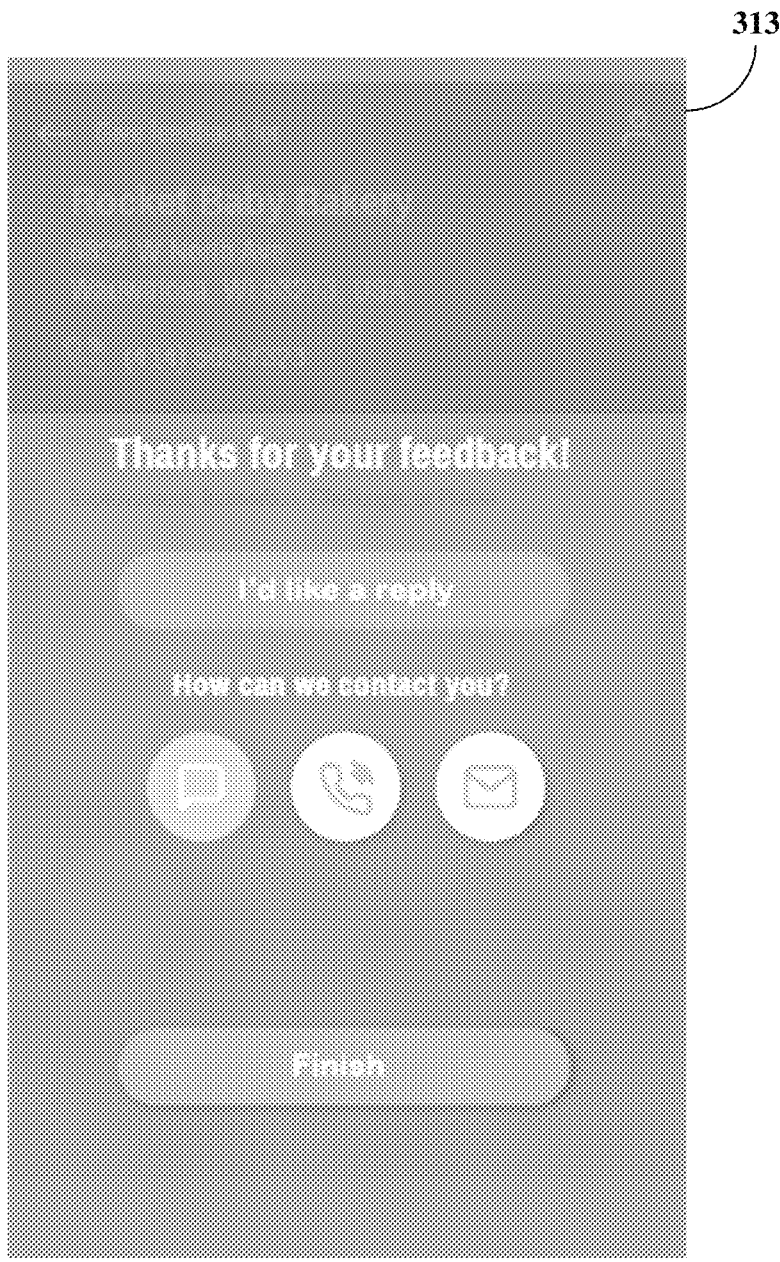
Figure 3P:
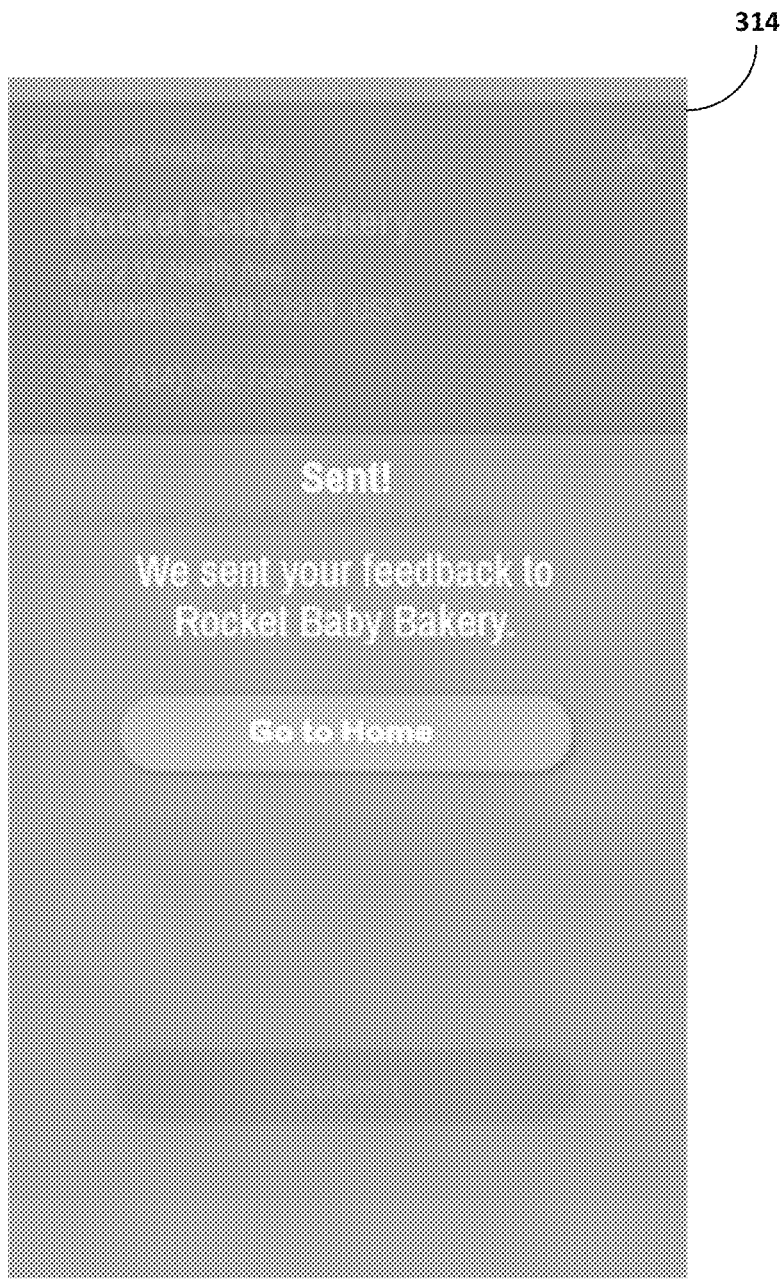
Figure 3Q:
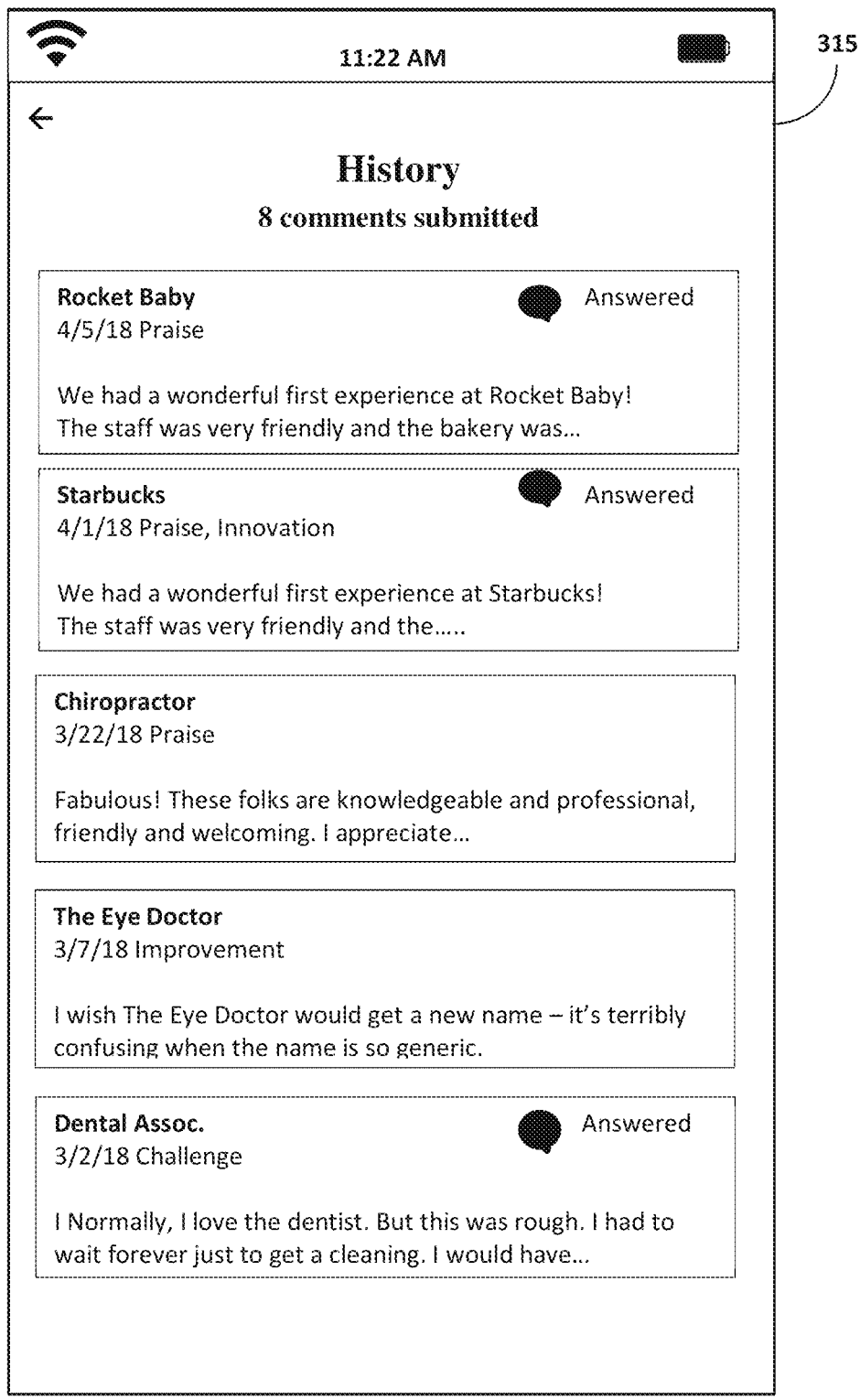
Figure 3R:
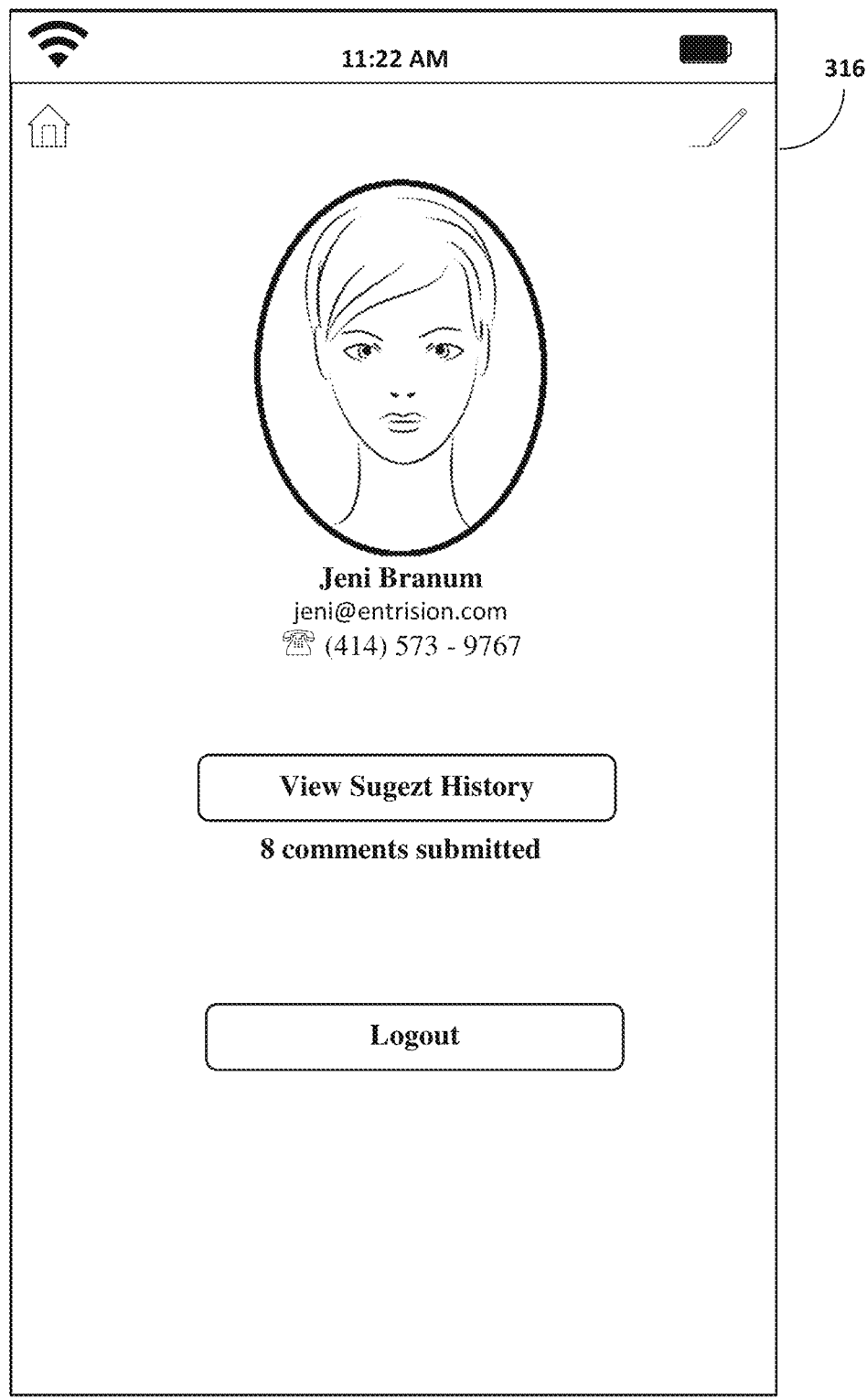
Figure 3S:

FIGS. 3A-3S exemplarily illustrate screenshots of graphical user interfaces (GUIs) 301 to 317 rendered by the direct-to-business feedback communication and database management system (DTBFCDMS) 201 on a customer device for communicating feedback from a customer to a business entity directly in real time. FIG. 3A exemplarily illustrates a screenshot of a GUI 301 rendered by the DTBFCDMS 201 on a customer device 202 for introducing the DTBFCDMS 201 to the customer, where the GUI 301 displays a welcome message to a customer. FIG. 3B exemplarily illustrates a screenshot of a GUI 302 rendered by the DTBFCDMS 201 on the customer device for providing a description about the working of the DTBFCDMS 201 to the customer.

FIGS. 3C-3D exemplarily illustrate screenshots of graphical user interfaces (GUIs) 303 rendered by the direct-to-business feedback communication and database management system (DTBFCDMS) 201 on the customer device for displaying descriptions of the feedback categories provided by the DTBFCDMS 201 for receiving feedback from the customer. The DTBFCDMS 201 provides, for example, four feedback categories as exemplarily illustrated in FIGS. 3C-3D. The feedback categories comprise the improvement category for receiving feedback about an improvement to an existing service, product or experience; the innovation category for receiving feedback about an innovation or a new idea that does not exist in the business of the business entity; the challenge category for receiving feedback about a challenge or a problem the customer encountered and would like to resolve or communicate with the business entity in order to fix the challenge or the problem; and the praise category for receiving praise for a great service or a great experience the customer received.

FIGS. 3E-3F exemplarily illustrate screenshots of graphical user interfaces (GUIs) 304 and 305 rendered by the direct-to-business feedback communication and database management system (DTBFCDMS) 201 on the customer device for registering a customer with the DTBFCDMS 201.

As exemplarily illustrated in FIG. 3E, the DTBFCDMS 201 prompts the customer to provide a valid electronic mail (email) identifier via the GUI 304. The DTBFCDMS 201 allows validated customers with validated experiences to earn rewards and promotions and to participate in pop-up suggestion contests. As exemplarily illustrated in FIG. 3F, the DTBFCDMS 201 allows a customer to set up a profile via the GUI 305 by requesting for additional information from the customer. The DTBFCDMS 201 requests the customer to provide, for example, a first name of the customer, a last name of the customer, a telephone number of the customer, and a password for accessing the client application deployed on the customer device 202 via the GUI 305 as exemplarily illustrated in FIG. 3F.

FIGS. 3G-3H exemplarily illustrate screenshots of graphical user interfaces (GUIs) 306 and 307 rendered by the direct-to-business feedback communication and database management system (DTBFCDMS) 201 on the customer device for allowing a customer to search for a business entity using the search engine of the DTBFCDMS 201. As exemplarily illustrated in FIG. 3G, the search engine 201j renders a search field on the GUI 306 to allow the customer to enter a name of a business for which the customer wants to provide feedback, as a search query, and renders search results based on the entered search query via the GUI 307 exemplarily illustrated in FIG. 3H. The DTBFCDMS 201 also lists business entities that are in proximity to the location of the customer device via the GUI 306 as exemplarily illustrated in FIG. 3G. The customer can select one of the business entities that the search engine 201j displays on the GUI 306 based on a proximity to the current location of the customer with the customer device 202, that is, the geographic locale, for providing feedback.

FIG. 3I exemplarily illustrates a screenshot of the customer feedback interface 308 displayed by the direct-to-business feedback communication and database management system (DTBFCDMS) 201 on the customer device for rendering feedback categories to the customer and requesting a selection of one of the feedback categories from the customer. The feedback communication module of the DTBFCDMS 201 renders the feedback categories, for example, the improvement category, the innovation category, the challenge category, and the praise category to the customer via the customer feedback interface 308 for selection as exemplarily illustrated in FIG. 3I. The feedback communication module 201k receives a selection of a feedback category from the customer via the customer feedback interface 308. The DTBFCDMS 201 allows the customer to select, for example, one feedback category out of four feedback categories at a time. The DTBFCDMS 201 requests a positive suggestion about what change the customer would prefer in the business of the business entity to make the business better if the customer selects a feedback category, for example, the challenge category that reflects dissatisfaction.

FIGS. 3J-3K exemplarily illustrate screenshots of the customer feedback interface 309 rendered by the direct-to-business feedback communication and database management system (DTBFCDMS) 201 on the customer device for requesting feedback associated with the selected feedback category. The DTBFCDMS 201 provides an area on the customer feedback interface 309 for receiving feedback provided by the customer. As exemplarily illustrated in FIGS. 3J-3K, the DTBFCDMS 201 receives feedback associated with the praise category as text from the customer via the customer feedback interface 309. The customer may also provide upload images with the feedback to the DTBFCDMS 201 via the customer feedback interface 309.

FIG. 3L exemplarily illustrates a screenshot of the customer feedback interface 310 rendered by the direct-to-business feedback communication and database management system (DTBFCDMS) 201 on the customer device 202 for reviewing the feedback. The DTBFCDMS 201 displays the feedback entered and/or uploaded by the customer on the customer feedback interface 310 for facilitating a review of the feedback before transmitting the feedback to the business entity directly. FIG. 3M exemplarily illustrates a screenshot of the customer feedback interface 311 rendered by the DTBFCDMS 201 on the customer device 202 for requesting feedback submission. The DTBFCDMS 201 prompts the customer to submit the feedback for transmitting the provided feedback to the business entity directly.

FIG. 3N exemplarily illustrates a screenshot of a graphical user interface (GUI) 312 rendered by the direct-to-business feedback communication and database management system (DTBFCDMS) 201 on the customer device 202 for providing options to select a type of feedback submission. The DTBFCDMS 201, after receiving an input from the customer to submit the feedback, provides options to submit the provided feedback anonymously or to request a response from the business entity for the provided feedback. The DTBFCDMS 201 prompts the customer to select one of the provided options via the GUI 312.

FIG. 3O exemplarily illustrates a screenshot of a graphical user interface (GUI) 313 rendered by the direct-to-business feedback communication and database management system (DTBFCDMS) 201 on the customer device 202 for receiving a selection of a communication mode for a feedback response from the business entity. The DTBFCDMS 201, after receiving a selection of the option to request a response from the business entity to the provided feedback, from the customer, provides options to the customer to select a communication mode that the customer prefers for receiving the response to the provided feedback from the business entity. The DTBFCDMS 201 provides options of multiple communication modes comprising, for example, a message on the customer device, a phone call to the registered telephone number of the customer device, or an electronic mail to the provided electronic mail identifier, through which the customer can receive a response from the business entity to the provided feedback. As suggestions are provided by customers, the DTBFCDMS 201 provides feedback responses from the business entity to the customers.

FIG. 3P exemplarily illustrates a screenshot of a graphical user interface (GUI) 314 rendered by the direct-to-business feedback communication and database management system (DTBFCDMS) 201 on the customer device 202 for displaying a successful transmission of the feedback to the business entity. The DTBFCDMS 201 confirms submission of the feedback to the business entity via the GUI 314 as exemplarily illustrated in FIG. 3P. FIG. 3Q exemplarily illustrates a screenshot of a GUI 315 rendered by the DTBFCDMS 201 on the customer device 202 for displaying history of feedback submitted by the customer to one or more business entities. FIG. 3R exemplarily illustrates a screenshot of a GUI 316 rendered by the DTBFCDMS 201 on the customer device for displaying customer information. FIG. 3S exemplarily illustrates a GUI 317 rendered by the DTBFCDMS 201 on the customer device 202 for editing the customer information. The businesses entity promotes usage of the DTBFCDMS 201 at a place of the business for receiving suggestions for improvement and innovation directly.

It will be readily apparent in different embodiments that the various methods, algorithms, and computer programs disclosed herein are implemented on non-transitory computer readable storage media appropriately programmed for computing devices. The non-transitory computer readable storage media participates in providing data, for example, instructions that are read by a computer, a processor or a similar device. In different embodiments, the "non-transitory computer readable storage media" further refers to a single medium or multiple media, for example, a centralized database, a distributed database, and/or associated caches and servers that store one or more sets of instructions that are read by a computer, a processor or a similar device. The "non-transitory computer readable storage media" further refers to any medium capable of storing or encoding a set of instructions for execution by a computer, a processor or a similar device and that causes a computer, a processor or a similar device to perform any one or more of the methods disclosed herein. Common forms of non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft® .NET, Objective-C®, etc. Other object-oriented, functional, scripting, and/or logical programming languages can also be used. In an embodiment, the computer program codes or software programs are stored on or in one or more mediums as object code. In another embodiment, various aspects of the method and the direct-to-business feedback communication and database management system (DTBFCDMS) 201 disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the method and the DTBFCDMS 201 disclosed herein are implemented as programmed elements, or non-programmed elements, or any suitable combination thereof.

Where databases are described such as the database 201o and the one or more client databases 201h, it will be understood by one of ordinary skill in the art that (i)

alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the direct-to-business feedback communication and database management system (DTBFCDMS) 201, the databases are integrated to communicate with each other for enabling simultaneous updates of data linked across the databases, when there are any updates to the data in one of the databases.

The method and the direct-to-business feedback communication and database management system (DTBFCDMS) 201 disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The method and the direct-to-business feedback communication and database management system (DTBFCDMS) 201 disclosed herein are not limited to a particular computer system platform, processor, operating system, or network. In an embodiment, one or more aspects of the method and the DTBFCDMS 201 disclosed herein are distributed among one or more computer systems, for example, servers configured to provide one or more services to one or more client computers, or to perform a complete task in a distributed system. For example, one or more aspects of the method and the DTBFCDMS 201 disclosed herein are performed on a client-server system that comprises components distributed among one or more server systems that perform multiple functions according to various embodiments. These components comprise, for example, executable, intermediate, or interpreted code, which communicate over a network using a communication protocol. The method and the DTBFCDMS 201 disclosed herein are not limited to be executable on any particular system or group of systems, and are not limited to any particular distributed architecture, network, or communication protocol.

The foregoing examples have been provided merely for explanation and are in no way to be construed as limiting of the direct-to-business feedback communication and database management system (DTBFCDMS) 201 disclosed herein. While the DTBFCDMS 201 has been described with reference to various embodiments, it is understood that the words, which have been used herein, are words of description and illustration, rather than words of limitation. Furthermore, although the DTBFCDMS 201 has been described herein with reference to particular means, materials, and embodiments, the DTBFCDMS 201 is not intended to be limited to the particulars disclosed herein; rather, the DTBFCDMS 201 extends to all functionally equivalent structures, methods and uses, such as are within the scope of the appended claims. While multiple embodiments are disclosed, it will be understood by those skilled in the art, having the benefit of the teachings of this specification, that the DTBFCDMS 201 disclosed herein are capable of modifications and other embodiments may be effected and changes may be made thereto, without departing from the scope and spirit of the DTBFCDMS 201 disclosed herein.

I claim:

1. A method for communicating enhanced feedback from a customer directly to a business entity in real time, the method employing a direct-to-business feedback communication and database management system, the method comprising:

receiving a search query related to the business entity from a customer device by the direct-to-business feedback communication and database management system;

rendering information of the business entity on a graphical user interface of the customer device in real time by the direct-to-business feedback communication and database management system;

rendering a customer feedback interface with a plurality of feedback categories on the graphical user interface of the customer device in real time by the direct-to-business feedback communication and database management system;

receiving a selection of one or more of the feedback categories and feedback of one or more media types associated with the one or more of the feedback categories based on the selection from the customer device in real time via the customer feedback interface rendered on the customer device by the direct-to-business feedback communication and database management system;

storing the received feedback in one or more of a plurality of client databases in real time, by the direct-to-business feedback communication and database management system;

extracting one or more feedback elements from the stored feedback in real time by the direct-to-business feedback communication and database management system, wherein the direct-to-business feedback communication and database management system comprises an artificial intelligence (AI) engine that applies natural language processing to scan the stored feedback and identify the feedback elements;

weighting each of the extracted one or more feedback elements based on a predetermined weighting criteria in real time by the direct-to-business feedback communication and database management system;

transmitting a question to the customer feedback interface on the graphical user interface of the customer device, by the direct-to-business feedback communication and database management system, requesting the customer for an input regarding likelihood of the customer recommending the business entity to others;

calculating a net promoter score (NPS) based on the answer to the question and previous content acquired from the customer, by the direct-to-business feedback communication and database management system;

analyzing the net promoter score (NPS) and calculating a unique experience opportunity score (EOS) with qualitative data that identifies opportunities for improvement, training suggestions, and positive customer stories to boost employee engagement at the business entity, by the direct-to-business feedback communication and database management system;

generating a score for the received feedback based on the weighting of the each of the extracted feedback elements in real time by the direct-to-business feedback communication and database management system, wherein the generated score comprises an artificial intelligence quality score (AQS), the net promoter score (NPS), and the unique experience opportunity score (EOS);

and transmitting the received feedback with the generated score comprising the enhanced feedback directly to the business entity in real time, by the direct-to-business feedback communication and database management system, wherein the generated score comprises the artificial intelligence quality score (AQS), the net promoter score (NPS), and the unique experience opportunity score (EOS).

2. The method of claim 1, wherein the feedback categories comprise an improvement category, an innovation category, a challenge category, and a praise category.

3. The method of claim 1, wherein the media types comprise text, image, audio, video, multimedia, and any combination thereof.

4. The method of claim 1, wherein the predetermined weighting criteria comprise importance, implementation, gamification, and incentivization.

5. The method of claim 1, wherein the direct-to-business feedback communication and database management system renders an interaction option on the customer feedback interface for further communication on the received feedback between the business entity and the customer.

6. A direct-to-business feedback communication and database management system incorporating a computer system architecture for communicating enhanced feedback from a customer directly to a business entity in real time, the direct-to-business feedback communication and database management system comprising:

at least one application computer server comprising at least one processor for controlling a client application deployed on a customer device and rendering a customer feedback interface on the customer device; and at least one processing computer server comprising at least one processor communicatively coupled to the at least one application computer server via a network, the at least one processor of the at least one processing computer server configured to execute computer program instructions defined by modules of the direct-to-business feedback communication and database management system, the modules of the direct-to business feedback communication and database management system comprising:

a search engine for receiving a search query related to the business entity from the customer device and rendering information of the business entity on a graphical user interface of the customer device in real time;

a feedback communication module for rendering a plurality of feedback categories on the customer feedback interface rendered on the customer device in real time;

the feedback communication module for receiving a selection of one or more of the feedback categories and feedback of one or more media types associated with the one or more of the feedback categories based on the selection from the customer device in real time via the customer feedback interface rendered on the customer device;

a feedback storage module for storing the received feedback in real time in one or more of a plurality of client databases accessed by at least one database computer server of the direct-to-business feedback communication and database management system in real time;

a combination of a feedback processing module and an artificial intelligence (AI) engine for extracting one or more feedback elements from the stored feedback in real time, wherein the artificial intelligence (AI) engine applies natural language processing to scan the stored feedback and identify the feedback elements;

the feedback processing module for weighting each of the extracted one or more feedback elements based on predetermined weighting criteria in real time;

the feedback communication module for transmitting a question to the customer feedback interface on the graphical user interface of the customer device, requesting the customer for an input regarding likelihood of the customer recommending the business entity to others;

a feedback scoring module for calculating a net promoter score (NPS) based on the answer to the question and previous content acquired from the customer;

the feedback scoring module for analyzing the net promoter score (NPS) and calculating a unique experience opportunity score (EOS) with qualitative data that identifies opportunities for improvement, training suggestions, and positive customer stories to boost employee engagement at the business entity;

the feedback scoring module for generating a score for the received feedback based on the weighting of the each of the extracted feedback elements in real time, wherein the generated score comprises an artificial intelligence quality score (AQS), the net promoter score (NPS), and the unique experience opportunity score (EOS);

and the feedback communication module for transmitting the received feedback with the generated score comprising the enhanced feedback directly to the business entity in real time, wherein the generated score comprises the artificial intelligence quality score (AQS), the net promoter score (NPS), and the unique experience opportunity score (EOS).

7. The direct-to-business feedback communication and database management system of claim 6, wherein the feedback categories comprise an improvement category, an innovation category, a challenge category, and a praise category.

8. The direct-to-business feedback communication and database management system of claim 6, wherein the media types comprise text, image, audio, video, multimedia, and any combination thereof.

9. The direct-to-business feedback communication and database management system of claim 6, wherein the predetermined weighting criteria comprise importance, implementation, gamification, and incentivization.

10. The direct-to-business feedback communication and database management system of claim 6, wherein the feedback communication module renders an interaction option on the customer feedback interface for further communication on the received feedback between the business entity and the customer.

11. A non-transitory computer readable storage medium having embodied thereon, computer program codes comprising instructions executable by at least one processor for communicating enhanced feedback from a customer directly to a business entity in real time, the computer program codes comprising:
    a first computer program code for receiving a search query related to the business entity from a customer device;
    a second computer program code for rendering information of the business entity on a graphical user interface of the customer device in real time;
    a third computer program code for rendering a customer feedback interface with a plurality of feedback categories on the graphical user interface of the customer device in real time, wherein the feedback categories comprise an improvement category, an innovation category, a challenge category, and a praise category;
    a fourth computer program code for receiving a selection of one or more of the feedback categories and feedback of one or more media types associated with the one or more of the feedback categories based on the selection from the customer device in real time via the customer feedback interface rendered on the customer device, wherein the media types comprise text, image, audio, video, multimedia, and any combination thereof;
    a fifth computer program code for storing the received feedback in one or more of a plurality of client databases in real time;
    a sixth computer program code for extracting one or more feedback elements from the stored feedback in real time, wherein artificial intelligence (AI) engine applies natural language processing to scan the stored feedback and identify the feedback elements;
    a seventh computer program code for weighting each of the extracted one or more feedback elements based on predetermined weighting criteria in real time, wherein the predetermined weighting criteria comprise importance, implementation, gamification, and incentivization;
    an eighth computer program code for transmitting a question to the customer feedback interface on the graphical user interface of the customer device, requesting the customer for an input regarding likelihood of the customer recommending the business entity to others;
    a ninth computer program code for calculating a net promoter score (NPS) based on the answer to the question and previous content acquired from the customer;
    a tenth computer program code for analyzing the net promoter score (NPS) and calculating a unique experience opportunity score (EOS) with qualitative data that identifies opportunities for improvement, training suggestions, and positive customer stories to boost employee engagement at the business entity;
    an eleventh computer program code for generating a score for the received feedback based on the weighting of the each of the extracted feedback elements in real time, wherein the generated score comprises an artificial intelligence quality score (AQS), the net promoter score (NPS), and the unique experience opportunity score (EOS); and
    a twelfth computer program code for transmitting the received feedback with the generated score comprising the enhanced feedback directly to the business entity in real time, wherein the generated score comprises the artificial intelligence quality score (AQS), the net promoter score (NPS), and the unique experience opportunity score (EOS).

12. The non-transitory computer readable storage medium of claim 11, further comprising a thirteenth computer program code for rendering an interaction option on the customer feedback interface for further communication on the received feedback between the business entity and the customer.

* * * * *